United States Patent
Lee et al.

(10) Patent No.: US 10,416,720 B2
(45) Date of Patent: Sep. 17, 2019

(54) ELECTRONIC DEVICE COMPRISING TRANSPARENT DISPLAY AND METHOD FOR CONTROLLING TRANSPARENT DISPLAY THEREOF

(71) Applicant: Samsung Electronics Co., Ltd., Gyeonggi-do (KR)

(72) Inventors: Yong-Yeon Lee, Gyeonggi-do (KR); Dong-Goo Kang, Seoul (KR); Yeo-Jun Yoon, Seoul (KR); Yun-Kyung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 54 days.

(21) Appl. No.: 15/440,878

(22) Filed: Feb. 23, 2017

(65) Prior Publication Data
US 2017/0242646 A1    Aug. 24, 2017

(30) Foreign Application Priority Data
Feb. 23, 2016    (KR) .................. 10-2016-0021496

(51) Int. Cl.
*G06F 1/16*    (2006.01)
*G06F 3/01*    (2006.01)
(Continued)

(52) U.S. Cl.
CPC .......... *G06F 1/1647* (2013.01); *G06F 1/1641* (2013.01); *G06F 3/013* (2013.01); *G06F 3/0304* (2013.01); *G06F 3/041* (2013.01)

(58) Field of Classification Search
CPC .... G06F 3/1446; G06F 1/1641; G06F 1/1647; G06F 3/013
See application file for complete search history.

(56) References Cited

U.S. PATENT DOCUMENTS

2010/0182265 A1*  7/2010  Kim .................. G06F 1/1616
                                                    345/173
2011/0116017 A1   5/2011  Gere
(Continued)

FOREIGN PATENT DOCUMENTS

KR    20100125938    12/2010
KR    20110038980    4/2011
(Continued)

OTHER PUBLICATIONS

International Search Report dated Jun. 1, 2017 issued in counterpart application No. PCT/KR2017/002010, 11 pages.

*Primary Examiner* — Laurence J Lee
(74) *Attorney, Agent, or Firm* — The Farrell Law Firm, P.C.

(57) ABSTRACT

An electronic device and method are provided, the electronic device includes a first display configured to display a screen, a second display including a first surface facing the screen of the first display in a first state and a second surface opposing the first surface, a connector pivotally connecting the first display and the second display with each other, and a processor controlling display of at least some objects among a plurality of objects displayed on the screen of the first display on the second display, based on an angle between the first display and the second display. The method displays a screen on the first display, and displays at least some objects among a plurality of objects displayed on the screen of the first display on the second display, based on an angle between the first display and the second display.

20 Claims, 35 Drawing Sheets

(51) Int. Cl.
*G06F 3/03* (2006.01)
*G06F 3/041* (2006.01)

(56) References Cited

U.S. PATENT DOCUMENTS

| | | | | |
|---|---|---|---|---|
| 2012/0272179 | A1* | 10/2012 | Stafford | G06F 3/012 |
| | | | | 715/781 |
| 2013/0127885 | A1* | 5/2013 | Morris | G06F 3/1423 |
| | | | | 345/541 |
| 2014/0210737 | A1 | 7/2014 | Hwang et al. | |
| 2015/0220299 | A1* | 8/2015 | Kim | G06F 3/0488 |
| | | | | 345/1.3 |
| 2016/0077550 | A1* | 3/2016 | Zhang | G06F 1/1643 |
| | | | | 715/765 |

FOREIGN PATENT DOCUMENTS

| | | |
|---|---|---|
| KR | 20130046846 | 5/2013 |
| WO | WO 2012/138744 | 10/2012 |

\* cited by examiner

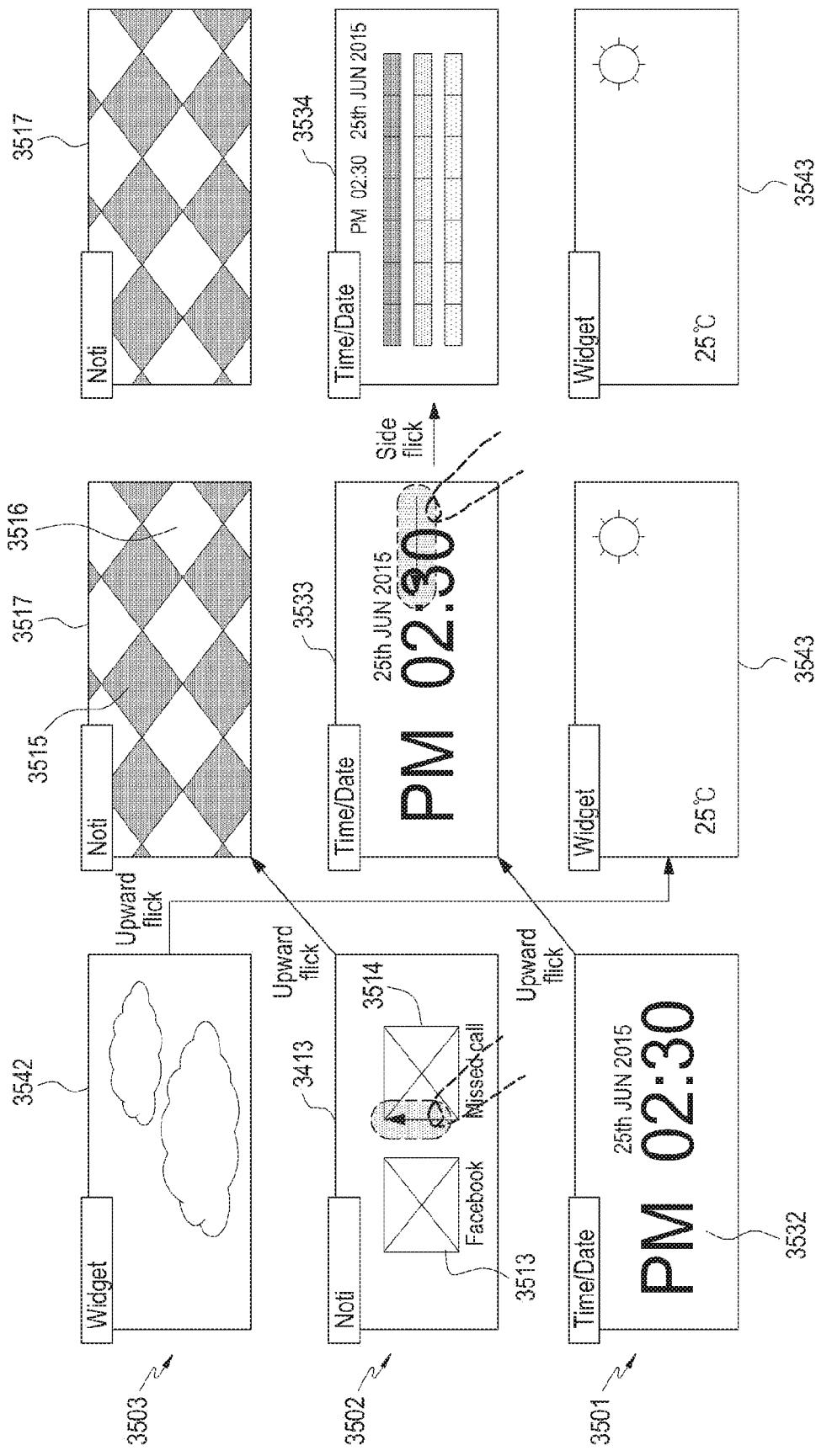

ELECTRONIC DEVICE COMPRISING TRANSPARENT DISPLAY AND METHOD FOR CONTROLLING TRANSPARENT DISPLAY THEREOF

PRIORITY

This application claims priority under 35 U.S.C. § 119(a) to Korean Patent Application Serial No. 10-2016-0021496, which was filed in the Korean Intellectual Property Office on Feb. 23, 2016, the entire disclosure of which is incorporated herein by reference.

BACKGROUND

1. Field of the Disclosure

The present disclosure relates to an electronic device and a method for controlling the same, and more particularly, to a method for controlling a transparent display of an electronic device.

2. Description of the Related Art

Technologies for integrating transparent displays into existing opaque displays of smartphones are known.

When an application is run through a smartphone, users may see a screen of the running application on a transparent display along with an existing opaque display.

Accordingly, when a smartphone is used, the user has to provide an input for enlarging a periphery of a particular object on a screen displayed on the opaque display, and also needs to touch the object on the screen displayed on the opaque display to check detailed information about the object.

SUMMARY

Aspects of the present disclosure have been made to address at least the above-mentioned problems and/or disadvantages and to provide at least the advantages described below. Accordingly, the present disclosure provides an electronic device in which at least some objects among a plurality of objects displayed on an opaque display is automatically displayed on a transparent display based on an angle between the transparent display and the opaque display.

In accordance with an aspect of the present disclosure, there is provided an electronic device. The electronic device includes a first display configured to display a screen, a second display including a first surface facing the screen of the first display in a first state and a second surface opposing the first surface, a connector configured to pivotally connect the first display and the second display with each other, and a processor configured to display at least some objects among a plurality of objects displayed on the screen of the first display on the second display, based on an angle between the first display and the second display.

In accordance with an aspect of the present disclosure, there is provided a method for controlling an electronic device comprising a first display configured to display a screen, a second display including a first surface facing the screen of the first display in a first state and a second surface opposing the first surface, and a connector configured to pivotally connect the first display and the second display with each other. The method includes displaying a screen on the first display, and displaying at least some objects among a plurality of objects displayed on the screen of the first display on the second display, based on an angle between the first display and the second display.

In accordance with an aspect of the present disclosure, there is provided an electronic device. The electronic device includes a first display configured to display a screen, a second display including a first surface facing the screen of the first display in a first state and a second surface opposing the first surface, a connector configured to pivotally connect the first display and the second display with each other, and a processor configured to display at least some objects among a plurality of objects displayed on the screen of the first display on the second display, based on an angle between the first display and the second display, wherein the electronic device comprises a third surface that faces the first surface and the screen of the first display, and the processor is further configured to display an animation effect on a third display displaying the remaining objects of the plurality of objects on the second display.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 35 illustrates a diagram of displaying information, according to an embodiment of the present disclosure.

Throughout the drawings, like reference numerals will be understood to refer to like parts, components, and structures.

DETAILED DESCRIPTION

Figure 1:
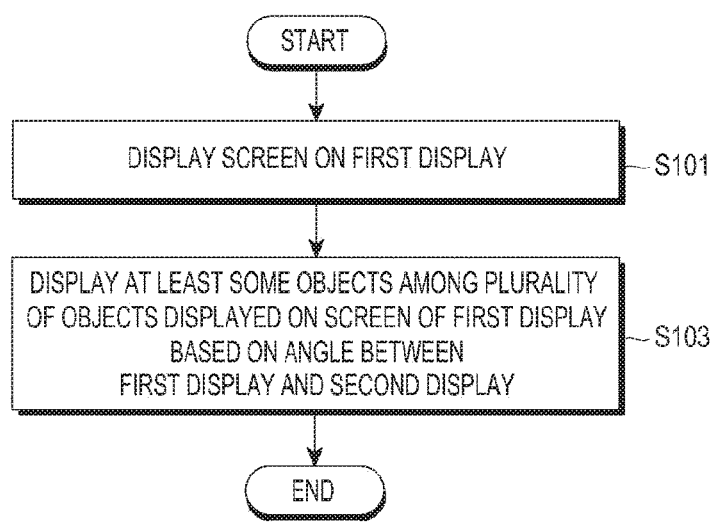
FIG. 1 is a flowchart of a method for controlling an electronic device, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to" may mean that the apparatus is "capable of" along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to the embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

FIG. 1 is a flowchart of a method for controlling an electronic device, according to an embodiment of the present disclosure.

As illustrated in FIG. 1, in step S101, the electronic device displays a screen on a first display.

The electronic device may include the first display and a processor that displays the screen on the first display.

The processor of the electronic device may display the screen on the first display and may display the screen including a plurality of objects on the first display.

For example, the screen may include a running screen and/or content of an application.

The plurality of objects may include a plurality of objects included in the running screen of the application. The plurality of objects may include a plurality of objects included in content.

The electronic device may include a second display, and the first display may be an opaque display and the second display may be a transparent display.

The second display may include a first surface facing a screen of the first display and a second surface opposing the first surface in a first state. The first state may be defined as a state in which the first display and the second display overlap each other.

The electronic device may include a connector that pivotally connects the first display with the second display.

The first display and the second display may form a specific angle therebetween as the first display and/or the second display pivot.

In step S103, the processor displays at least some objects among the plurality of objects displayed on the screen of the first display on the second display, based on the angle between the first display and the second display.

After sensing that the first display and the second display are opened at a predetermined angle in the first state, the processor may detect at least some objects among the plurality of objects included in an application screen and/or content displayed on the screen of the first display based on the angle between the first display and the second display.

After detecting at least some objects among the plurality of objects included in the application screen and/or content displayed on the screen of the first display, the processor may display the detected at least some objects on the second display.

After detecting at least some objects among the plurality of objects included in the application screen and/or content displayed on the screen of the first display, the processor may display the detected at least some objects on the second display according to a preset condition, which may be set based on a user's input and/or a manufacturer.

The processor may detect at least some objects among the plurality of objects included in the application screen and/or content displayed on the screen of the first display, and enlarge and display the detected at least some objects on the second display.

The processor may detect at least some objects among the plurality of objects included in the application screen and/or content displayed on the screen of the first display, and detect a touch input with respect to the second display.

The processor may detect at least some objects among the plurality of objects included in the application screen and/or content displayed on the screen of the first display, detect a touch input with respect to the second display, and then enlarge and display the detected touch and/or detected at least some objects on the second display.

The processor may detect at least some objects among the plurality of objects included in the application screen and/or content displayed on the screen of the first display, detect a touch input with respect to the second display, and then display detailed information regarding the detected touch and/or detected at least some objects on the second display.

The processor may detect at least some objects among the plurality of objects included in the application screen and/or content displayed on the screen of the first display, and if the angle is a first angle, the processor may display the at least some objects among the plurality of objects on a second surface of the second display and reversely display the at least some objects, displayed on the second surface, on a first surface of the second display.

The processor may detect at least some objects among the plurality of objects included in the application screen and/or content displayed on the screen of the first display, and if the angle is a second angle, the processor may display the at least some objects among the plurality of objects on the first surface of the second display and reversely display the at least some objects, displayed on the first surface, on the second surface of the second display.

The processor may detect at least some objects among the plurality of objects included in the application screen and/or content displayed on the screen of the first display and detect a touch input with respect to the second display, and then if the angle is a third angle, the processor may enlarge and display the at least some objects among the plurality of objects on the second display.

The processor may detect at least some objects among the plurality of objects included in the application screen and/or content displayed on the screen of the first display and detect a touch input with respect to the second display, and then if the angle is a fourth angle, the processor may display detailed information regarding the at least some objects among the plurality of objects on the second display.

The electronic device may further include a camera module, which may be provided on the second surface of the second display and/or the first display in the electronic device.

The camera module may obtain user gaze information corresponding to the electronic device. For example, the camera module may obtain a direction of a gaze of the user.

The electronic device may determine a first angle or a second angle based on the user gaze information obtained by the camera module, and if the angle is the first angle, the electronic device may display at least some objects among the plurality of objects on the second surface of the second display and reversely display the at least some objects, displayed on the second surface, on the first surface of the second display.

The electronic device may determine a first angle or a second angle based on the user gaze information obtained by the camera module, and if the angle is the second angle, the electronic device may display at least some objects among the plurality of objects on the first surface of the second display and reversely display the at least some objects, displayed on the first surface, on the second surface of the second display.

The electronic device may display at least some objects among the plurality of objects on the second surface of the second display and other some objects among the plurality of objects on the screen of the first display, such that the plurality of objects may be displayed to correspond to a user's gaze direction based on the user gaze information obtained by the camera module as if the user views the plurality of objects in front of the first display.

The electronic device may include a third surface that faces the second surface of the second display and the screen of the first display, and display an animation effect indicating a third display displaying other some objects among the plurality of objects on the second display.

The processor may display at least some objects among the plurality of objects on the second display and display other some objects among the plurality of objects except for the at least some objects on the third display animation effect.

The processor may display at least some objects among the plurality of objects on the second surface of the second display and display other some objects among the plurality of objects except for the at least some objects on the third display animation effect.

Figure 2:
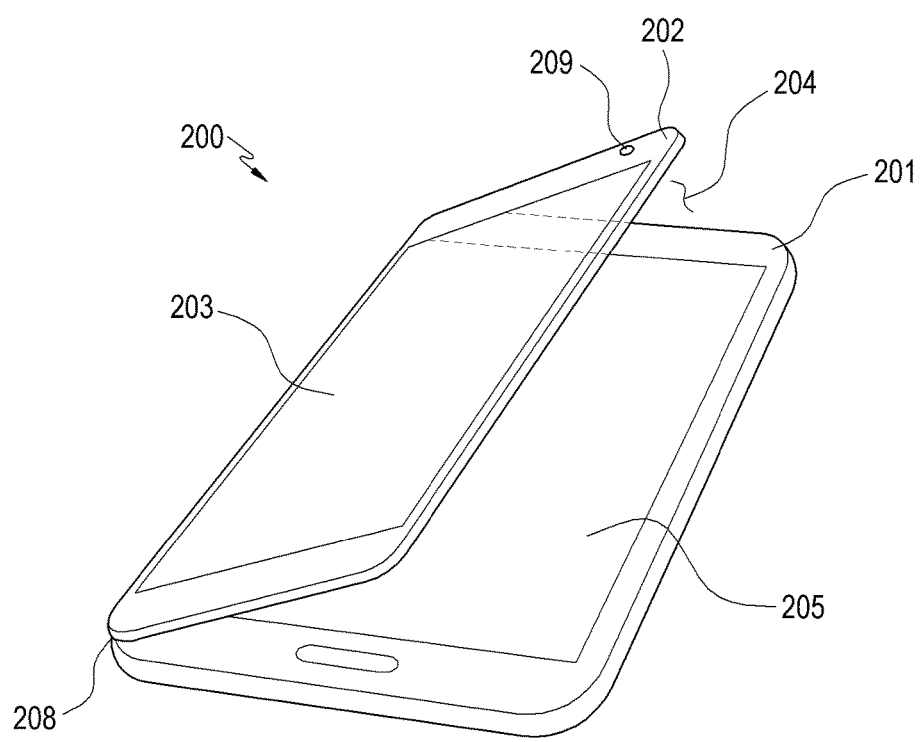
FIG. 2 illustrates an electronic device, according to an embodiment of the present disclosure.

FIG. 2 illustrates an electronic device, according to an embodiment of the present disclosure.

As illustrated in FIG. 2, an electronic device 200 includes a first display 201 including a screen 205, a second display 202 including a first surface 204 facing the screen 205 of the first display when overlapping the first display 201 and a second surface 203 opposing the first surface 204, a connector 208 that connects the first display 201 with the second display 202 to allow the first display 201 and the second display 202 to pivot, and a camera module 209 provided on the second display 202 to detect user gaze information.

The processor may obtain information about an angle between the first display 201 and the second display 202 from the connector 208, and display at least some objects among a plurality of objects displayed on the screen 205 of the first display 201 on the first surface 204 and/or the second surface 203 of the second display 202 based on the obtained angle information.

Figure 3A:
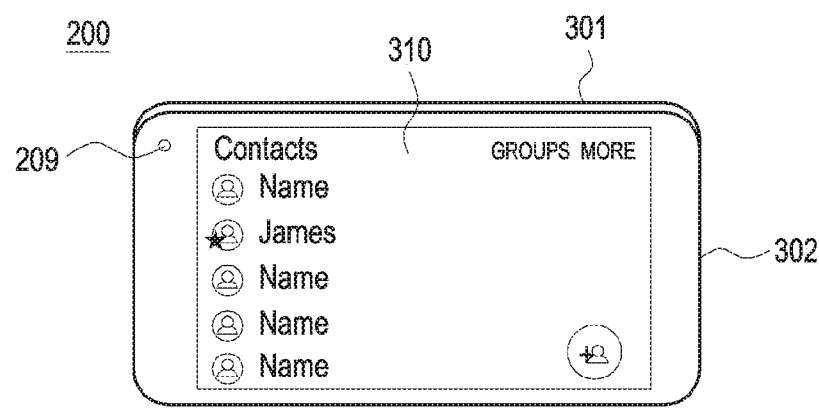
FIGS. 3A and 3B illustrate displaying at least some objects of an electronic device, according to an embodiment of the present disclosure.
Figure 3B:
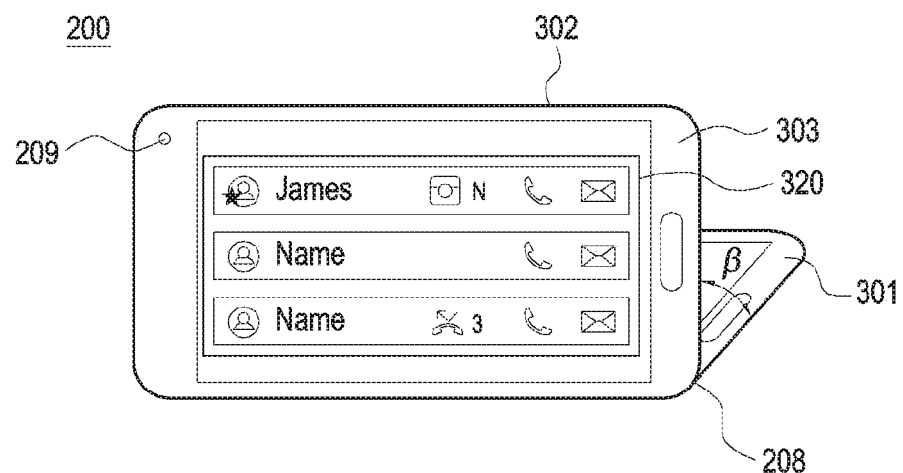

FIGS. 3A and 3B illustrate displaying at least some objects of an electronic device, according to an embodiment of the present disclosure.

As shown in FIG. 3A, a processor of the electronic device 200 displays a plurality of objects 310 on a first display 301 in a first, closed state where the first display 301 and a second display 302 overlap each other.

As shown in FIG. 3B, once sensing that the first display 301 and the second display 302 are opened at a predetermined angle for more in the first state where the first display 301 and the second display 302 overlap each other, the processor may display at least some objects 320 among the plurality of objects 310 displayed on the screen of the first display 301 on the second surface 303 of the second display 302.

If the first display 301 and the second display 302 are closed to overlap each other when the at least some objects 320 among the plurality of objects 310 displayed on the screen of the first display 301 are displayed on the second surface 303 of the second display 302, then the processor may display the plurality of objects 310 on the first display 301, as shown in FIG. 3A.

Figure 4:
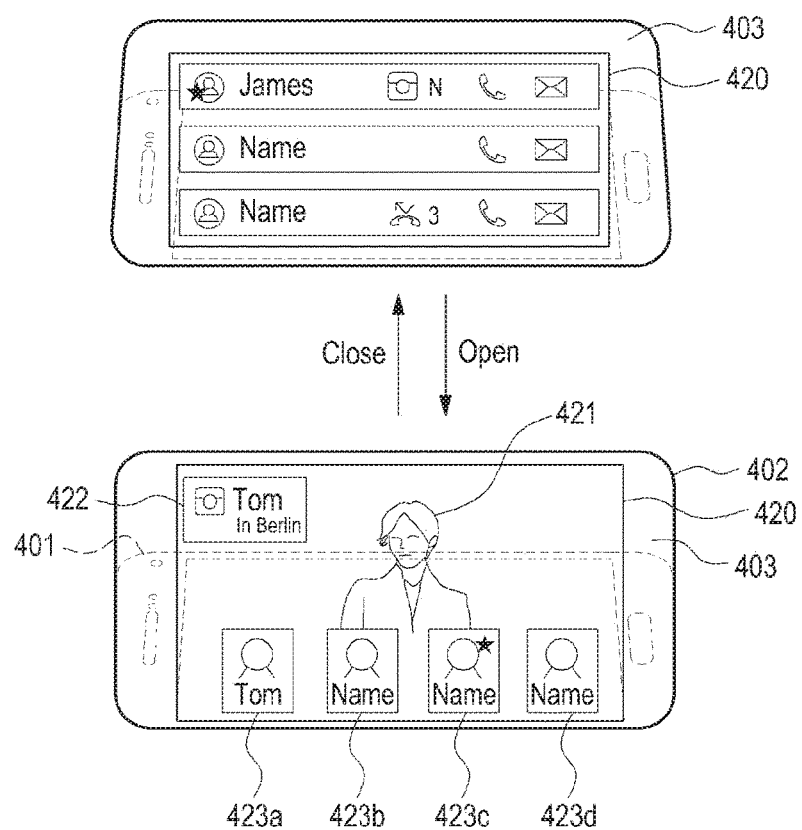
FIG. 4 illustrates displaying detailed information about some objects among at least some objects of an electronic device, according to an embodiment of the present disclosure.

FIG. 4 illustrates displaying detailed information about some objects among at least some objects of an electronic device, according to an embodiment of the present disclosure.

As shown in FIG. 4, in a state where a second display 402 and a first display 401 are opened at a particular angle (e.g., 10°), the processor may display at least some objects 420 on a second surface 403 of the second display 402.

In the state where the second display 402 and the first display 401 are opened at a particular angle (e.g., 10°) and in the state the at least some objects 420 are displayed on the second surface 403 of the second display 402, if the first display 401 and the second display 402 are further opened at an angle (e.g., 20°) more than the particular angle (e.g., 10°), then the processor may display detailed information about some objects among the at least some objects (423a, 423b, 423c, and 423d) on the second surface 403 of the second display 402.

The detailed information may include figure information 421 of the some objects and identification information 422 of the some objects.

Figure 5:
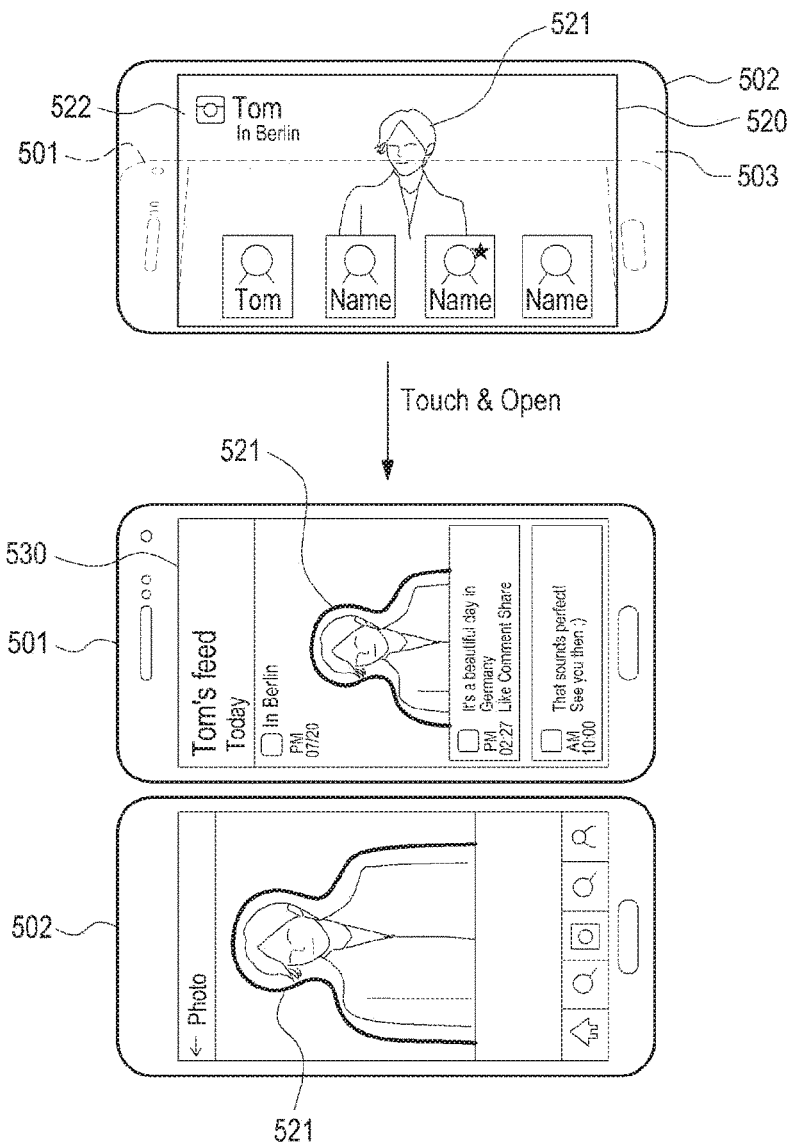
FIG. 5 shows screen shots of displaying detailed information about some objects among at least some objects of an electronic device, according to an embodiment of the present disclosure.

FIG. 5 shows screen shots of displaying detailed information about some objects among at least some objects of an electronic device, according to an embodiment of the present disclosure.

As shown in FIG. 5, in a state where the processor senses that a first display 501 and a second display 502 are opened at a particular angle (e.g., 20°) and displays detailed information 522 about some objects among at least some objects on a second surface 503 of the second display 502, the processor may sense a touch input with respect to the second display 502 and/or that the first display 501 and the second display 502 are opened at a particular angle (e.g., 180°), by using the connector 208.

Once sensing a touch input with respect to the second display 502 and/or that the first display 501 and the second display 502 are opened at a particular angle (e.g., 180°) by using the connector 208, the processor may display, on the first display 501, a detailed information screen 530 corresponding to figure information 521 of the some objects displayed on the second display 502 in the state where the first display 501 and the second display 502 are opened at a particular angle (e.g., 20°).

Figure 6:
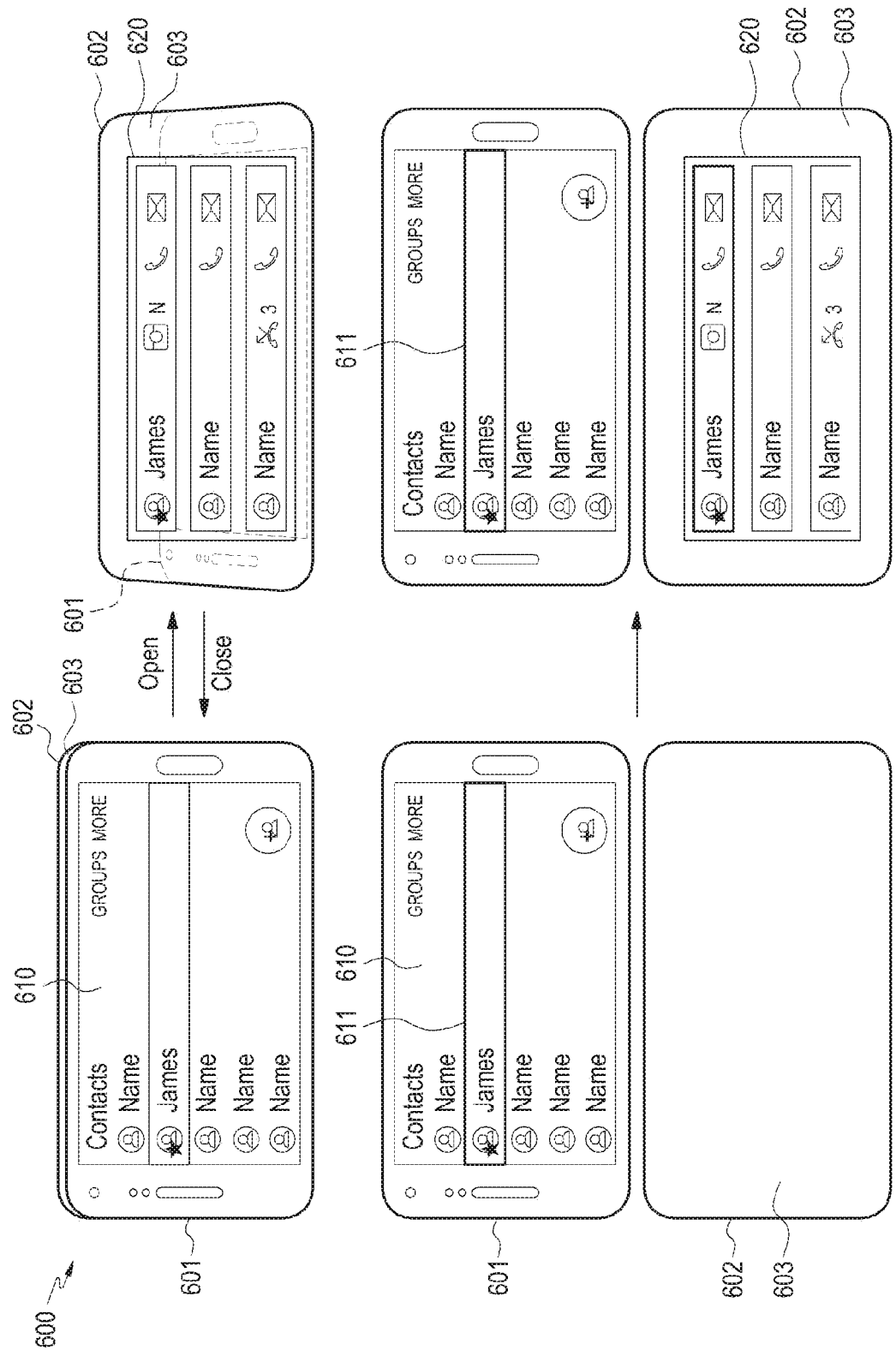
FIG. 6 shows screen shots of displaying a plurality of objects of an electronic device, according to an embodiment of the present disclosure.

FIG. 6 shows screen shots of displaying a plurality of objects of an electronic device, according to an embodiment of the present disclosure.

As shown in FIG. 6, a processor of an electronic device 600 displays a plurality of objects 610 on a first display 601 in a first state where the first display 601 and a second display 602 overlap each other.

The processor of the electronic device 600 may not display the plurality of objects 610 on a third surface 603 of the second display 602 in the first state where the first display 601 and the second display 602 overlap each other.

In a state where the plurality of objects 610 are displayed on the first display 601 in the first state where the first display 601 and the second display 602 overlap each other, the processor may sense that the first display 601 and the second display 602 enter a second state where the first display 601 and the second display 602 are opened at a predetermined angle (e.g., 10°) or more.

Once sensing that the first display 601 and the second display 602 enter the second state where they are opened at the predetermined angle (e.g., 10°) or more, the processor may detect at least some objects 611 among the plurality of objects 610 displayed on the screen of the first display 601 on the third surface 603 of the second display 602.

Once the at least some objects 611 among the plurality of objects 610 displayed on the screen of the first display 601 on the third surface 603 of the second display 602 are detected, the processor may display at least some objects 620 including the detected at least some objects 611 on the third surface 603 of the second display 602.

Figure 7:
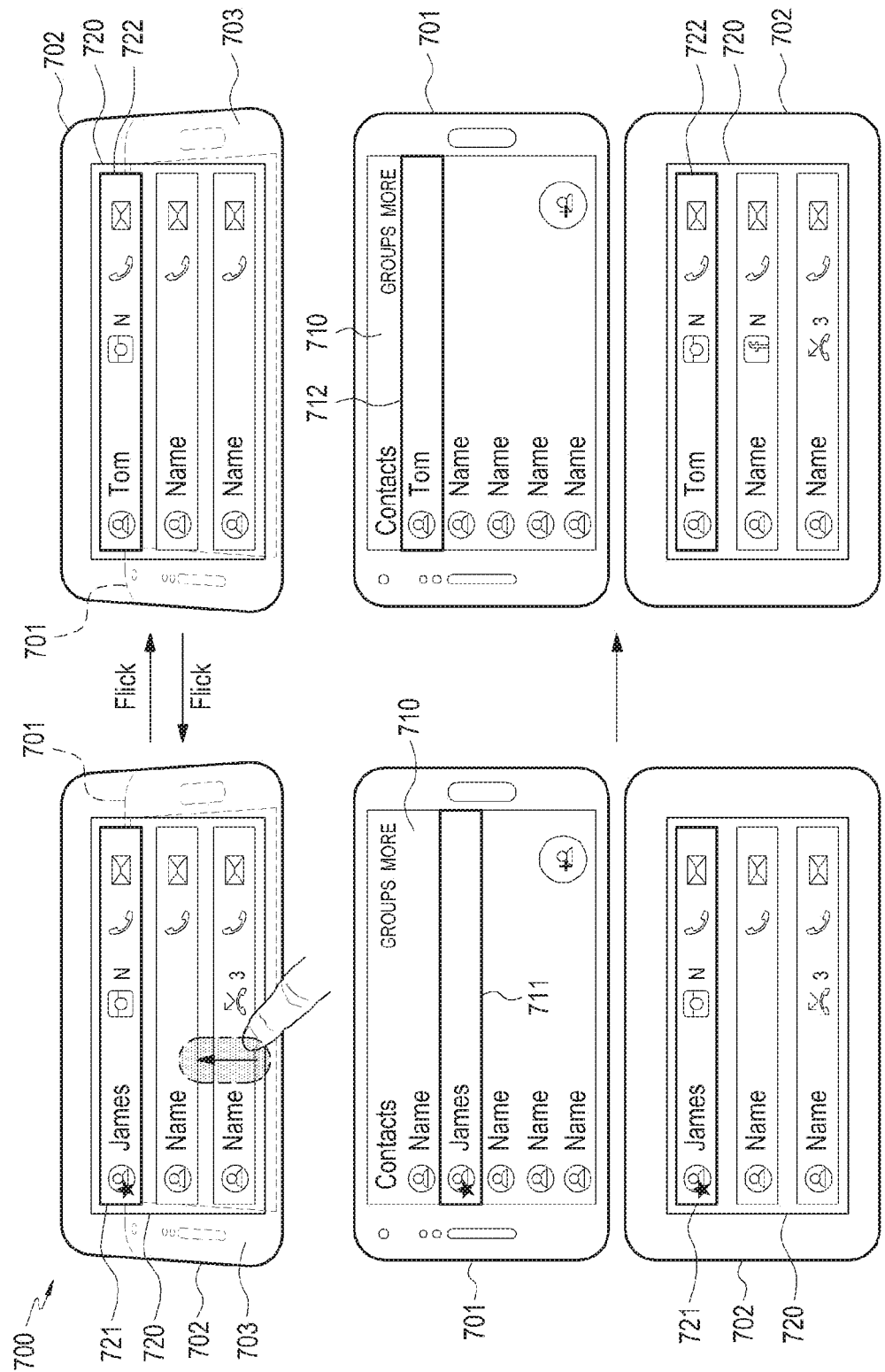
FIG. 7 shows screen shots of displaying a plurality of objects of an electronic device, according to an embodiment of the present disclosure.

FIG. 7 shows screen shots of displaying at least some objects of an electronic device 700, according to an embodiment of the present disclosure.

As shown in FIG. 7, in a state where at least some objects 720 including detected at least some objects 711 are displayed on a third surface 703 of a second display 702, the processor may sense an upward flick input on the third surface 703 of the second display 702.

Once the upward flick input on the third surface 703 of the second display 702 is sensed, t the processor may display at least some objects 720 including a second object 722 in place of the at least some objects 720 including a first object 721 on the second display 702. For example, the processor may change some objects included in the some objects 720 based on a flick input on the second display 702 in the state where the at least some objects 720 including the first object 721 are displayed on the second display 702.

Once the upward flick input on the third surface 703 of the second display 702 is sensed, the processor may display a plurality of objects 710 including a second object 712 in place of the plurality of objects 710 including a first object 711 on the first display 701. For example, the processor may change some objects included in the at least some objects 710 based on a flick input on the second display 702 in the state where the plurality of objects 720 including the first object 711 are displayed on the first display 701.

Figure 8:
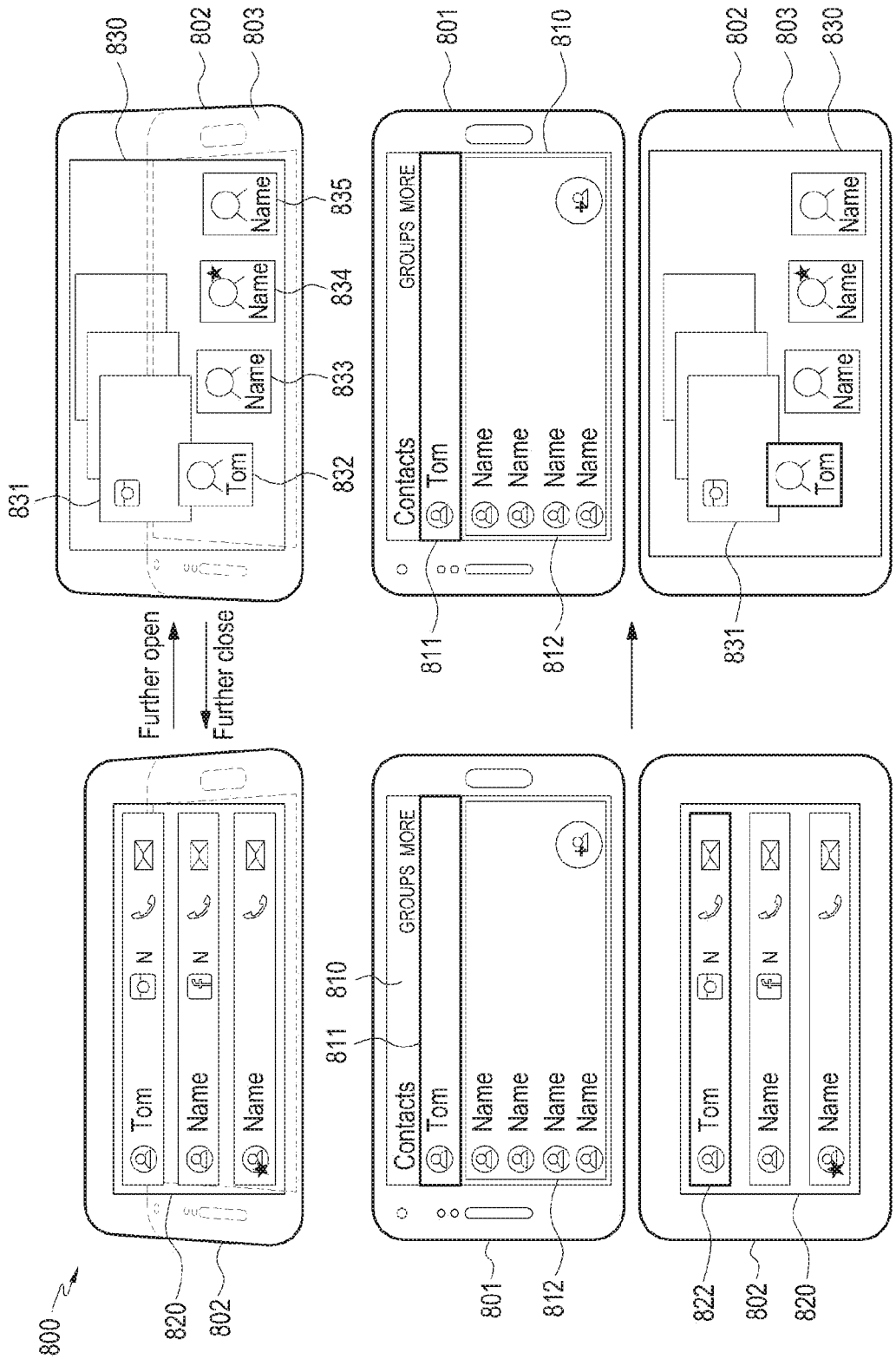
FIG. 8 shows screen shots of displaying detailed information about some objects among at least some objects of an electronic device, according to an embodiment of the present disclosure.

FIG. 8 shows screen shots of displaying detailed information about some objects among at least some objects of an electronic device, according to an embodiment of the present disclosure.

As shown in FIG. 8, when a processor of an electronic device 800 displays at least some objects 820 including a second object 822 instead of the at least some objects 810 including a first object 812 on a second display 802 and displays a plurality of objects 810 including a second object 812 instead of the plurality of objects 810 including a first object 812 on a first display 801, in the second state where the first display 801 and the second display 802 are opened at a predetermined angle (e.g., 10°) or more, the processor may sense a third state where the first display 801 and the second display 802 are opened at a predetermined angle (e.g., 20°) or more.

Once sensing that the third state where the first display 801 and the second display 802 are opened at the predetermined angle (e.g., 20°) or more, the processor may display a detailed information screen 820 including detailed information 831 about some objects 822 among the at least some objects 820 on a third surface 803 of the second display 802.

Figure 9:
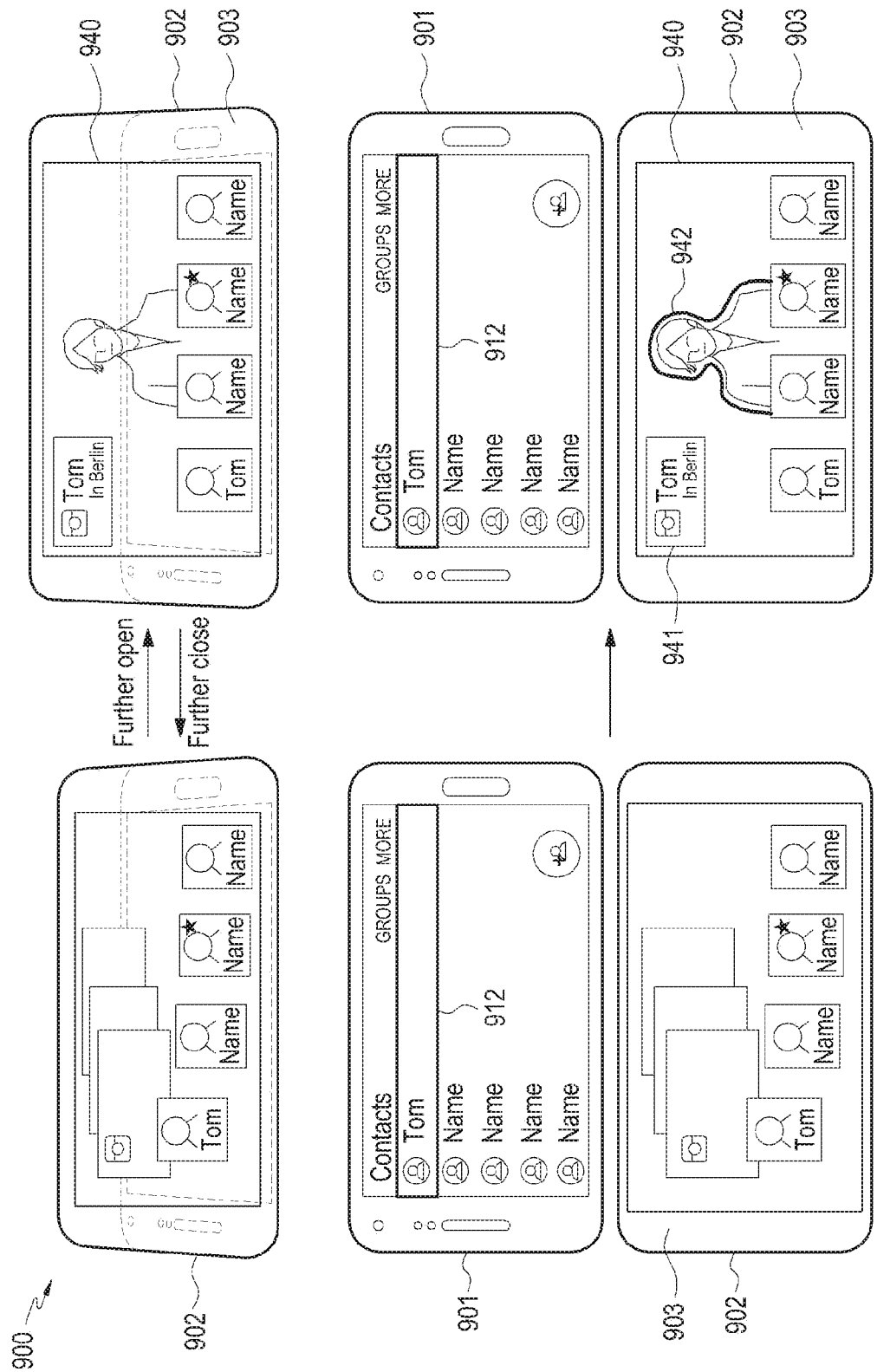
FIG. 9 shows screen shots of displaying detailed information about some objects of an electronic device, according to an embodiment of the present disclosure.

FIG. 9 shows screen shots of displaying detailed information about some objects of an electronic device 900, according to an embodiment of the present disclosure.

As shown in FIG. 9, when sensing that the third state where a first display 901 and a second display 902 are opened at a predetermined angle (e.g., 20°) or more, the processor may sense a fourth state where the first display 901 and the second display 902 are further opened at a predetermined angle (e.g., 30°) or more.

Once sensing that the fourth state where the first display 901 and the second display 902 are opened at the predetermined angle (e.g., 30°) or more, the processor may display a detailed information screen 940 including figure information 942 about some objects 912 and identification information 941 about the some objects 912 on a second surface 903 of the second display 902.

Figure 10:
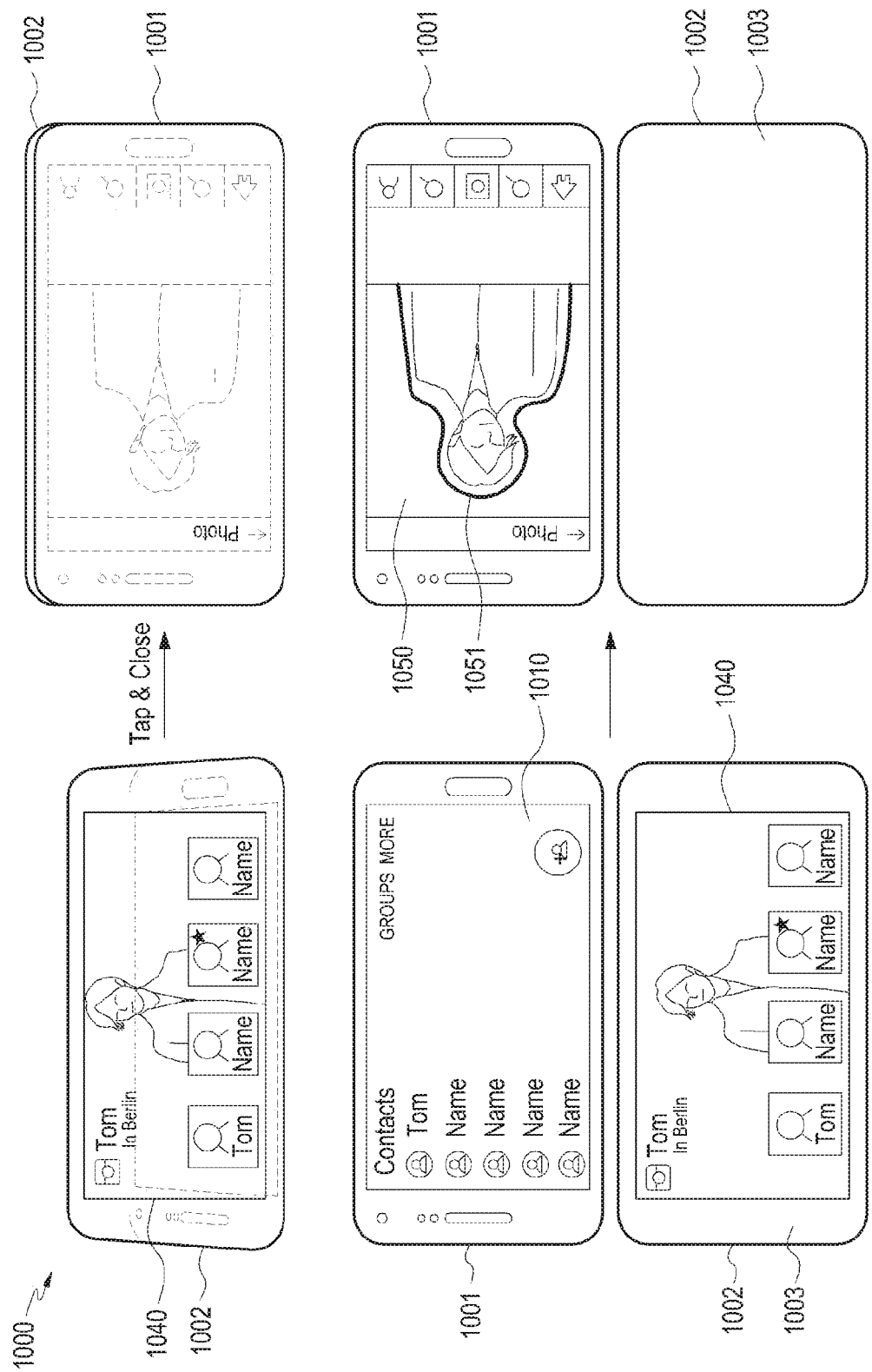
FIG. 10 shows screen shots of an electronic device, according to an embodiment of the present disclosure.

FIG. 10 shows screen shots of an electronic device 1000, according to an embodiment of the present disclosure.

As shown in FIG. 10, in the fourth state where a first display 1001 and a second display 1002 are opened at a predetermined angle (e.g., 30°) or more and in the state where a detailed information screen 1040 is displayed on the second display 1002, a processor of the electronic device 1000 may sense a touch input with respect to the second display 1002 and/or that the first display 1001 and the second display 1002 enter the first state where they overlap each other.

Once sensing that the touch input with respect to the second display 1002 and/or that the first display 1001 and the second display 1002 enter the first state where they overlap each other, the processor may display a detailed information screen 1050 including figure information 1051 about some objects (e.g., some objects 912) on the first display 1001.

Figure 11:
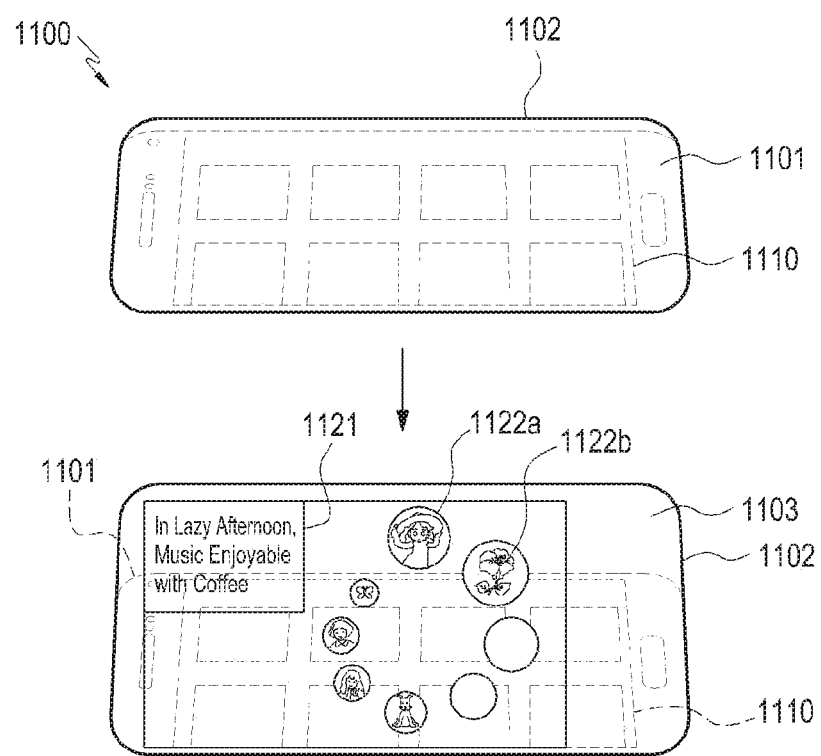
FIG. 11 illustrates a diagram of displaying at least some objects, according to an embodiment of the present disclosure.

FIG. 11 illustrates displaying at least some objects, according to an embodiment of the present disclosure.

As shown in FIG. 11, a processor of an electronic device 1100 displays a plurality of objects 1110 on a first display 1101 in the first state where the first display 1101 and a second display 1102 overlap each other.

In the first state where the first display 1101 and the second display 1102 overlap each other and in the state where the plurality of objects 1110 are displayed on the first display 1101, the processor may sense that the first display 1101 and the second display 1102 are opened at a predetermined angle (e.g., 10°) or more.

Once sensing that the first display 1101 and the second display 1102 are opened at the predetermined angle or more, the processor may display at least some objects 1122a and 1122b among the plurality of objects 1110 displayed on the first display 1101 on a second surface 1103 of the second display 1102.

Once sensing that the first display 1101 and the second display 1102 are opened at the predetermined angle or more, the processor may display the at least some objects 1122a and 1122b among the plurality of objects 1110 displayed on the first display 1101 and/or detailed information 1121 about the at least some objects 1122a and 1122b on the second surface 1103 of the second display 1102.

Figure 12:
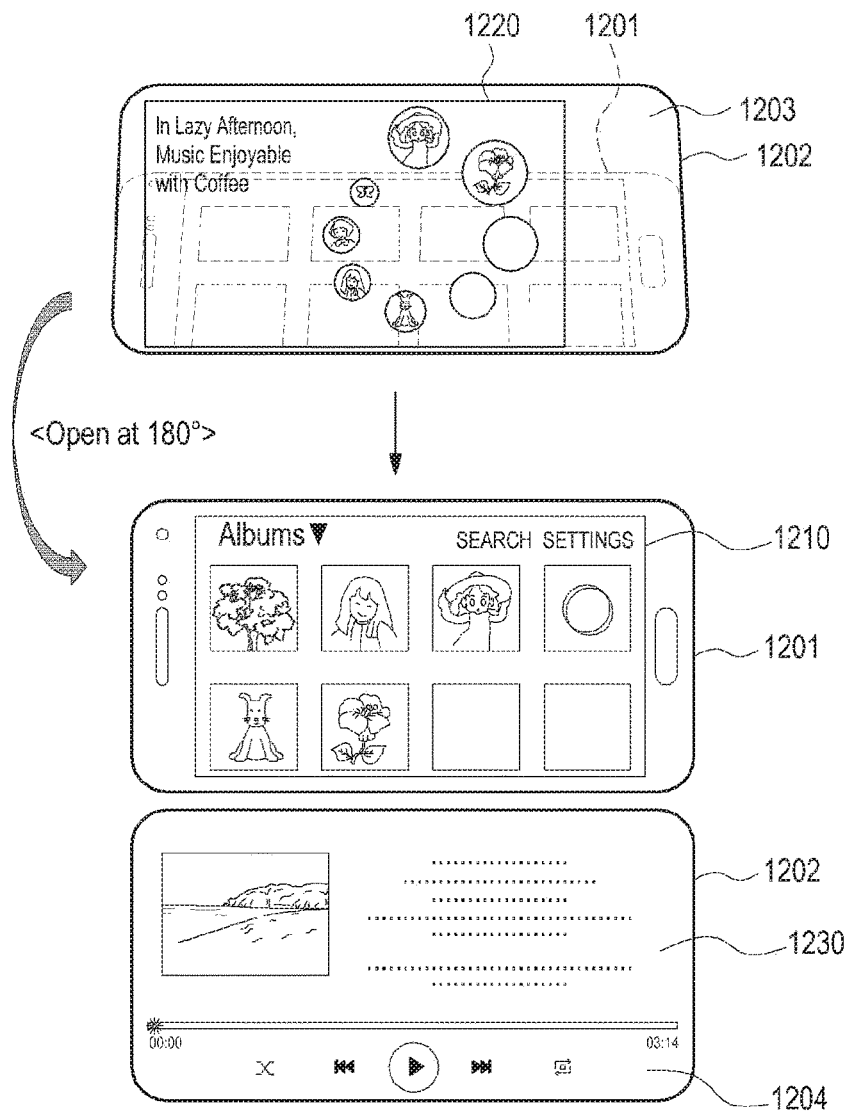
FIG. 12 illustrates a diagram of displaying at least some objects of an electronic device, according to an embodiment of the present disclosure.

FIG. 12 illustrates displaying at least some objects of an electronic device, according to an embodiment of the present disclosure.

As shown in FIG. 12, in the state where at least some objects 1220 are displayed on a second surface 1203 of a second display 1202 and in the second state where a first display 1201 and the second display 1202 are opened at a predetermined angle (e.g., 10°) or more, the processor may sense that the first display 1201 and the second display 1202 enter the third state where they are further opened at a predetermined angle (e.g., 180°).

Once sensing that the first display 1201 and the second display 1202 enter the third state where they are opened at the predetermined angle (e.g., 180°), the processor may display at least some objects 1220 displayed on a second surface 1203 of the second display 1202 on a screen 1210 of the first display 1201.

Once sensing that the first display 1201 and the second display 1202 enter the third state where they are opened at the predetermined angle (e.g., 180°), the processor may play some objects (e.g., an object 1122a such as a sound source of FIG. 11) among the at least some objects 1220 displayed on the second surface 1203 of the second display 1202 and display a play screen 1230 of the played object 1122a on a first surface 1204 of the second display 1202.

Figure 13:
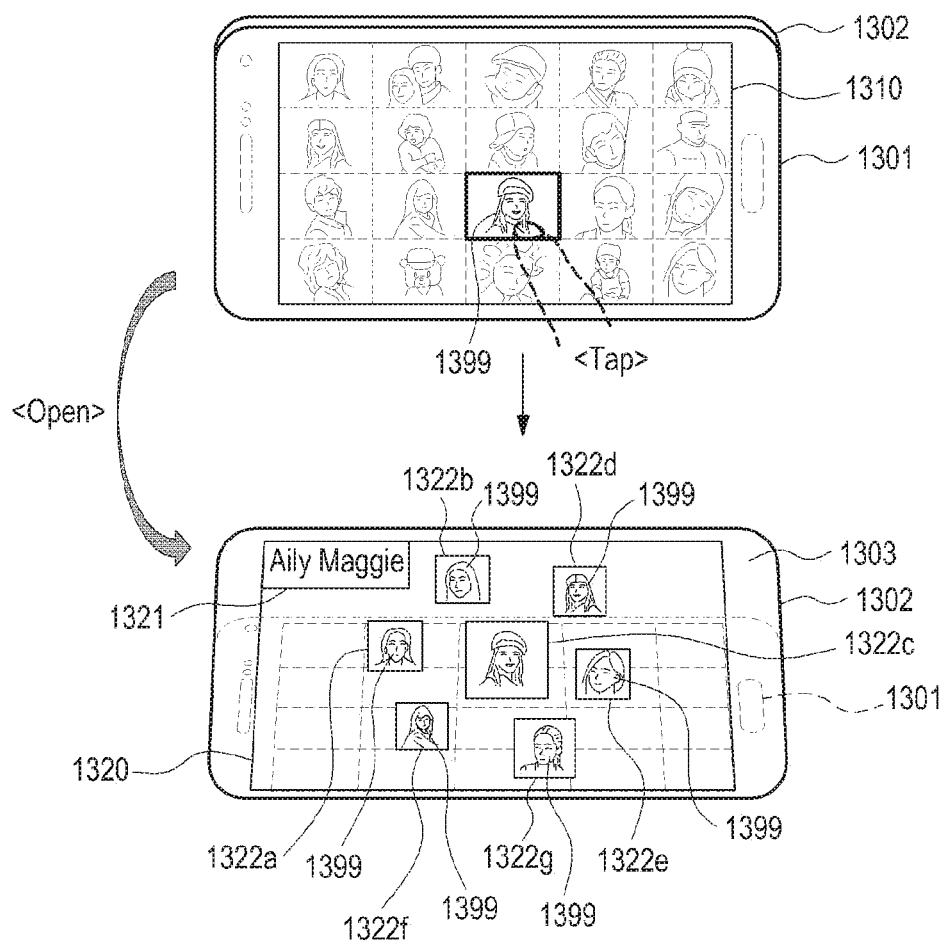
FIG. 13 illustrates a diagram of an electronic device, according to an embodiment of the present disclosure.

FIG. 13 illustrates an electronic device, according to an embodiment of the present disclosure.

As shown in FIG. 13, a processor of an electronic device displays a plurality of objects 1310 including a first object 1399 on a first display 1301 in the first state where the first display 1301 and a second display 1302 overlap each other.

For example, the plurality of objects 1310 may be a plurality of figure pictures 1310 including a first FIG. 1399.

In the state where the first display 1301 and the second display 1302 overlap each other and/or in the state where the plurality of objects 1310 including the first object 1399 are displayed on the first display 1301, the processor may sense a touch input (<tap>) with respect to the first object 1399 displayed through the second display 1302 and/or the second state where the first display 1301 and the second display 1302 are opened at a predetermined angle (e.g., 10°) or more.

Once sensing the touch input (<tap>) with respect to the second display 1302 and/or the second state where the first display 1301 and the second display 1302 are opened at the predetermined angle (or more, the processor may display the first object 1399 among the plurality of objects 1310 and at least some objects 1322a, 1322b, 1322c, 1322d, 1322e, 1322f, and 1322g including the first object 1399 among the plurality of objects 1310 on a third surface 1303 of the second display 1302.

Figure 14:
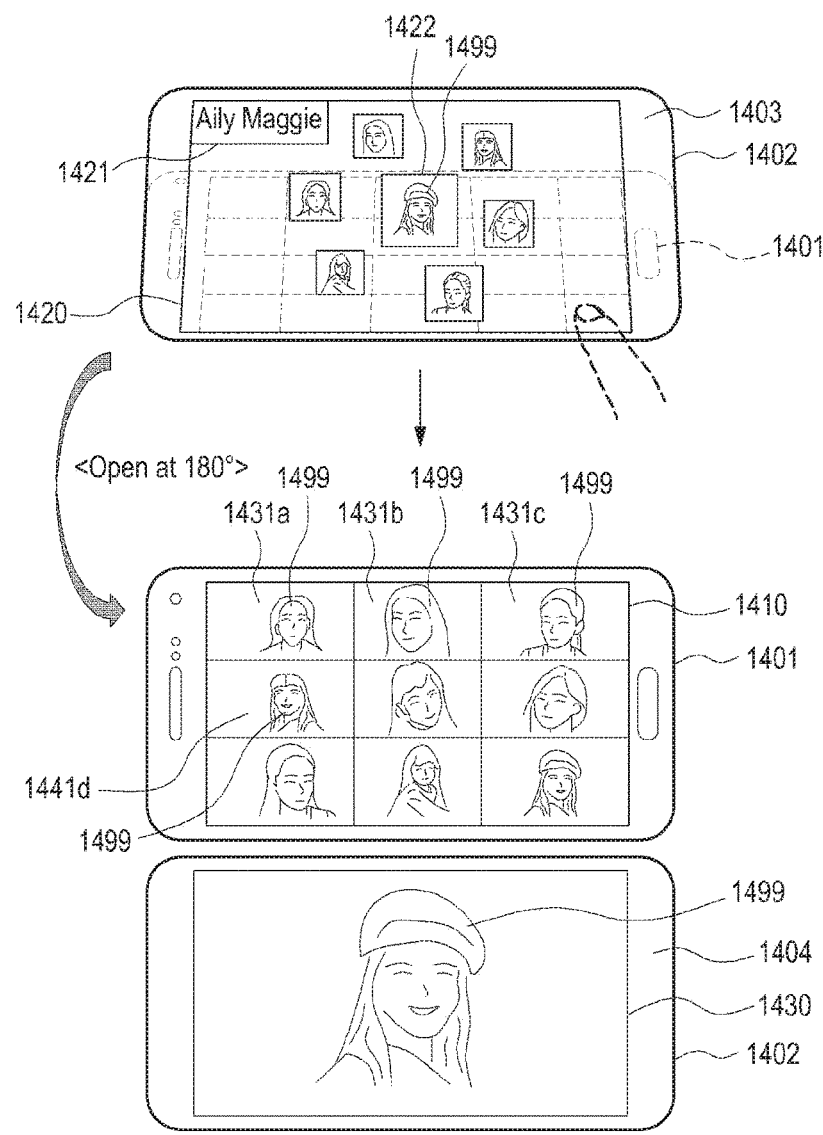
FIG. 14 illustrates a diagram of displaying detailed information about some objects of an electronic device, according to an embodiment of the present disclosure.

FIG. 14 illustrates displaying detailed information about some objects of an electronic device, according to an embodiment of the present disclosure.

As shown in FIG. 14, a processor of the electronic device displays at least some objects 1422 including a first object 1499 and identification information 1421 about the first object 1499 in the second state where a first display 1401 and a second display 1402 are opened at a predetermined angle (e.g., 10°) or more.

in the state where the at least some objects 1422 including the first object 1499 and the identification information 1421 about the first object 1499 are displayed in the second state where the first display 1401 and the second display 1402 are opened at a predetermined angle (e.g., 10°) or more, the processor senses the third state where the first display 1401 and the second display 1402 are opened at a predetermined angle (e.g., 180°) or more.

Once sensing the third state where the first display 1401 and the second display 1402 are opened at the predetermined angle (e.g., 180°) or more, the processor may display a detailed screen 1430 including the first object 1499 on a first surface 1404 of the second display 1402.

Once sensing the third state where the first display 1401 and the second display 1402 are opened at the predetermined angle (e.g., 180°) or more, the processor may display the detailed screen 1430 including the first object 1499 on the first surface 1404 of the second display 1402 and/or display a screen 1410 including a plurality of objects 1431a, 1431b, 1431c, and 1441d including the first object 1499 on the first display 1401.

Figure 15:
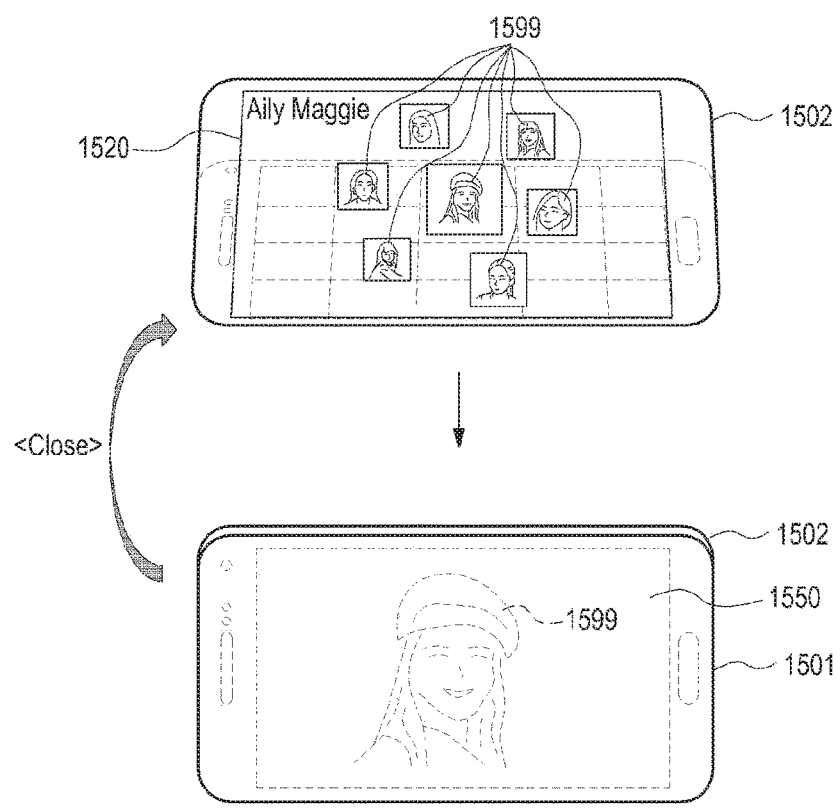
FIG. 15 illustrates a diagram of an electronic device, according to an embodiment of the present disclosure.

FIG. 15 illustrates an electronic device, according to an embodiment of the present disclosure.

As shown in FIG. 15, a processor of the electronic device displays at least some objects 1520 including a first object 1599 on a second display 1502.

In the state where the at least some objects 1520 including the first object 1599 are displayed on the second display 1502 and/or in the second state where a first display 1501 and the second display 1502 are opened at a predetermined angle (e.g., 10°) or more, the processor may sense that the first display 1501 and the second display 1502 enter the first state where they overlap each other.

Once sensing that the first display 1501 and the second display 1502 enter the first state where they overlap each other, the processor may display detailed information 1550 about the first object 1599 on the first display 1501.

Figure 16:
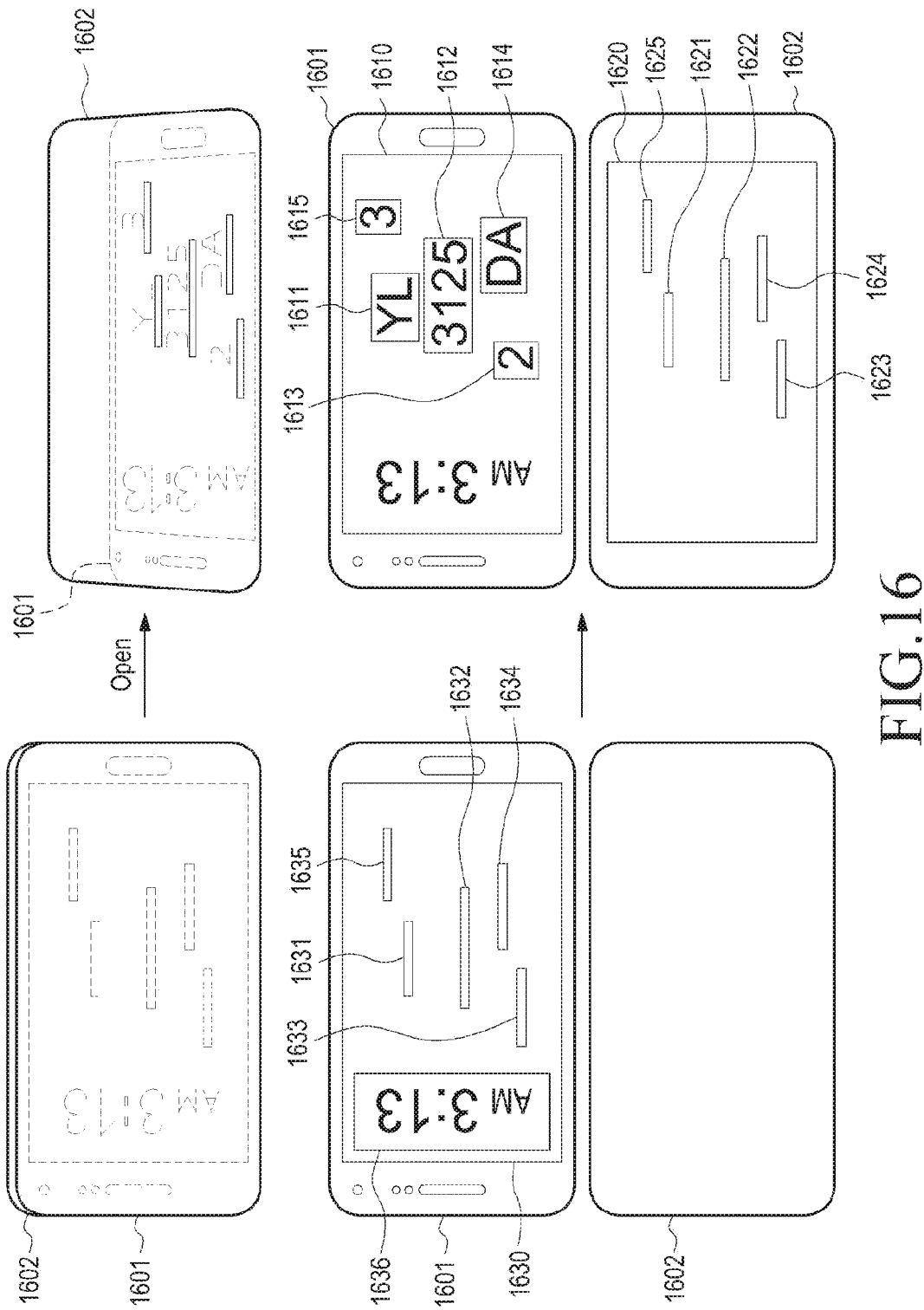
FIG. 16 shows screen shots of an electronic device, according to an embodiment of the present disclosure.

FIG. 16 shows screen shots of an electronic device, according to an embodiment of the present disclosure.

As shown in FIG. 16, a processor of the electronic device displays a plurality of objects 1631, 1632, 1633, 1634, 1635, and 1636 on a screen 1630 of a first display 1601 in the first state where the first display 1601 and a second display 1602 overlap each other.

In the first state where the first display 1601 and the second display 1602 overlap each other and/or in the state where the plurality of objects 1631, 1632, 1633, 1634, 1635, and 1636 are displayed on the screen 1630 of the first display 1601, the processor may sense the second state where the first display 1601 and the second display 1602 are opened at a predetermined angle (e.g., 10°) or more.

Once sensing the second state where the first display 1601 and the second display 1602 are opened at the predetermined angle or more, the processor may change the plurality of objects 1631, 1632, 1633, 1634, 1635, and 1636 displayed on the first display 1601 and display a plurality of changed objects 1611, 1612, 1613, 1614, and 1615 on the first display 1601.

Once sensing the second state where the first display 1601 and the second display 1602 are opened at the predetermined angle or more, the processor may display at least some objects 1621, 1622, 1623, 1624, and 1625 among the plurality of objects 1631, 1632, 1633, 1634, 1635, and 1636 displayed on a screen 1610 of the first display 1601 to on a screen 1620 of the second display 1602.

Figure 17:
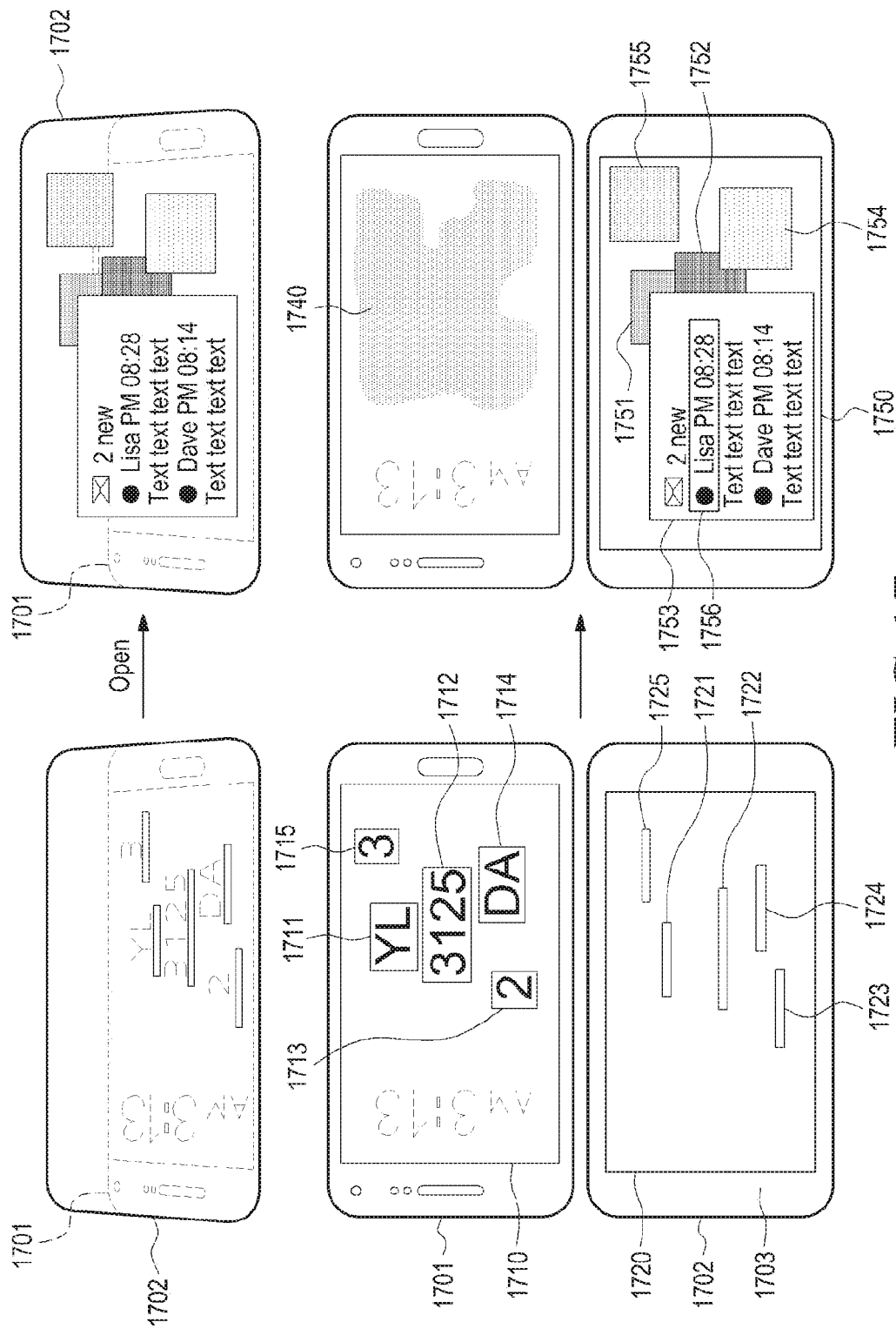
FIG. 17 shows screen shots of an electronic device, according to an embodiment of the present disclosure.

FIG. 17 shows screen shots of an electronic device, according to an embodiment of the present disclosure.

As shown in FIG. 17, in the second state where a first display 1701 and a second display 1702 are opened at a predetermined angle (e.g., 10°) or more, a processor of the electronic device displays a plurality of changed objects 1711, 1712, 1713, 1714, and 1715 on a screen 1710 of the first display 1701.

In the second state where the first display 1701 and the second display 1702 are opened at a predetermined angle (e.g., 10°) or more, a processor of the electronic device may display at least some objects 1721, 1722, 1723, 1724, and 1725 among a plurality of objects 1720 on a second surface 1703 of the second display 1702.

In the second state where the first display 1701 and the second display 1702 are opened at the predetermined angle or more, in the state where the plurality of changed objects 1711, 1712, 1713, 1714, and 1715 are displayed on the screen 1710 of the first display 1701, and in the state where the at least some objects 1721, 1722, 1723, 1724, and 1725 among the plurality of objects are displayed on a second surface 1703 of the second display 1702, the processor senses the third state where the first display 1701 and the second display 1701 are opened at a predetermined angle (e.g., 20°) or more. Once sensing the third state where the first display 1701 and the second display 1702 are opened at the predetermined angle (e.g., 20°) or more, the processor may display region information 1740 about a region where the plurality of objects 1711, 1712, 1713, 1714, and 1715 are displayed, instead of the plurality of objects 1711, 1712, 1713, 1714, and 1715, on the first display 1701.

Once sensing the third state where the first display 1701 and the second display 1702 are opened at the predetermined angle (e.g., 20°) or more, the processor may display at least some objects 1751, 1752, 1753, 1754, 1755, and 1756 that enlarge the some objects 1721, 1722, 1723, 1724, and 1725 and/or detailed information 1750 about the object 1723 on the second display 1702.

Figure 18:
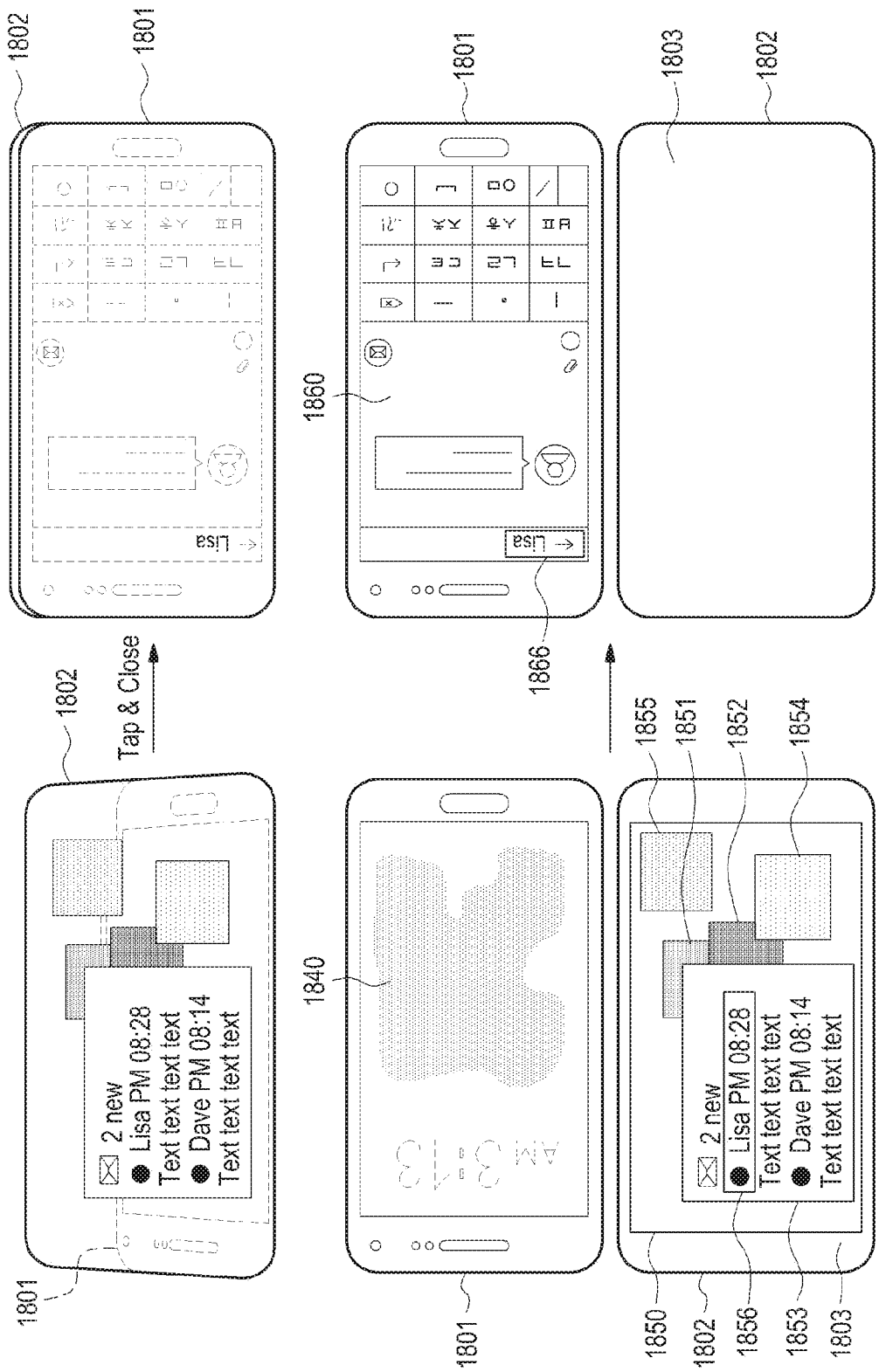
FIG. 18 shows screen shots of an electronic device, according to an embodiment of the present disclosure.

FIG. 18 shows screen shots of an electronic device, according to an embodiment of the present disclosure.

As shown in FIG. 18, in the state where the region information 1840 about the region where a plurality of objects are displayed is displayed on the first display 1801, and the some objects 1851, 1852, 1853, 1854, 1855 enlarging objects 1851, 1852, 1854, 1855 and detailed information 1850 about the object 1853 are displayed on the second display 1803, the processor may receive a touch input with respect to the object 1856 displayed on the second surface 1803 of the second display 1802 and/or sense the first state where the first display 1801 and the second display 1802 overlap each other.

Once receiving the touch input with respect to the object 1856 displayed on the second screen 1803 of the second display 1802 and/or sensing the first state where the first display 1801 and the second display 1802 overlap each other, the processor may display, on the first display 1801, a message send screen 1860 on which a message may be sent through the object 1866.

Figure 19:
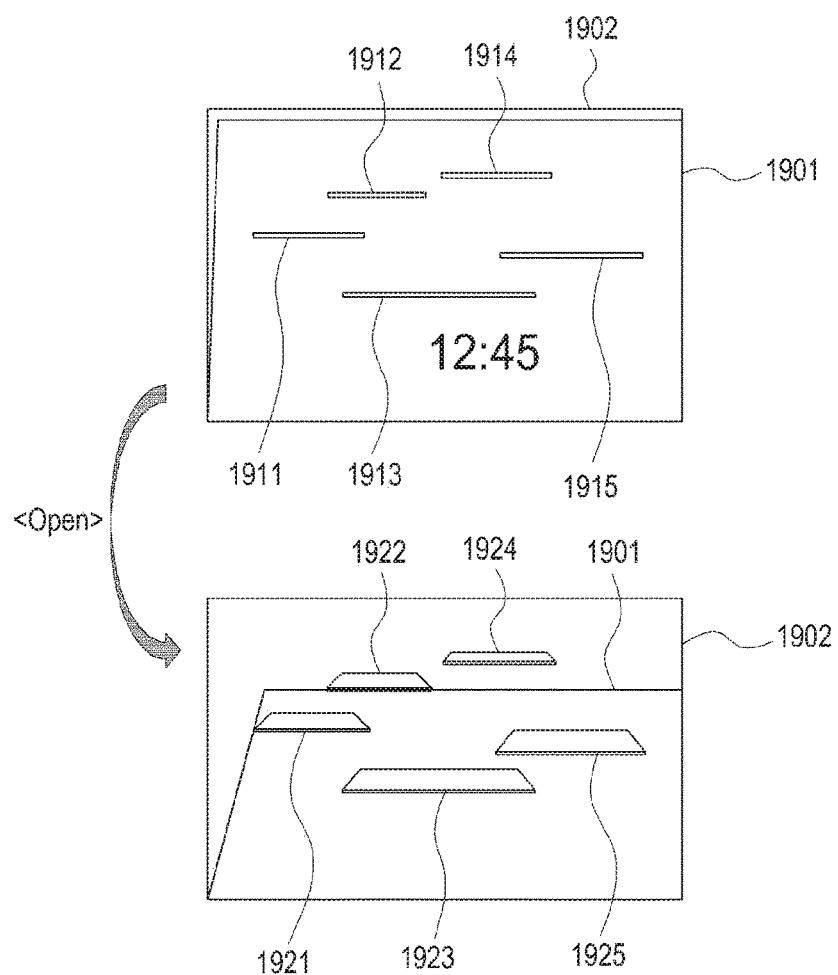
FIG. 19 illustrates a diagram of an electronic device, according to an embodiment of the present disclosure.

FIG. 19 is a diagram of an electronic device, according to an embodiment of the present disclosure.

As shown in FIG. 19, a processor of the electronic device displays a plurality of objects 1911, 1912, 1913, 1914, and 1915 on a first display 1901 in the first state where the first display 1901 and a second display 1902 overlap each other.

In the first state where the first display 1901 and the second display 1902 overlap each other and in the state where the plurality of objects 1911, 1912, 1913, 1914, and 1915 are displayed on the first display 1901, the processor may sense the second state where the first display 1901 and the second display 1902 are opened at a predetermined angle (e.g., 10°) or more.

Once sensing the second state where the first display 1901 and the second display 1902 are opened at the predetermined angle (e.g., 10°) or more, the processor may enlarge the plurality of objects 1911, 1912, 1913, 1914, and 1915 displayed on the first display 1901 and display a plurality of enlarged objects 1921, 1922, 1923, 1924, and 1925 on the second display 1902.

Figure 20:
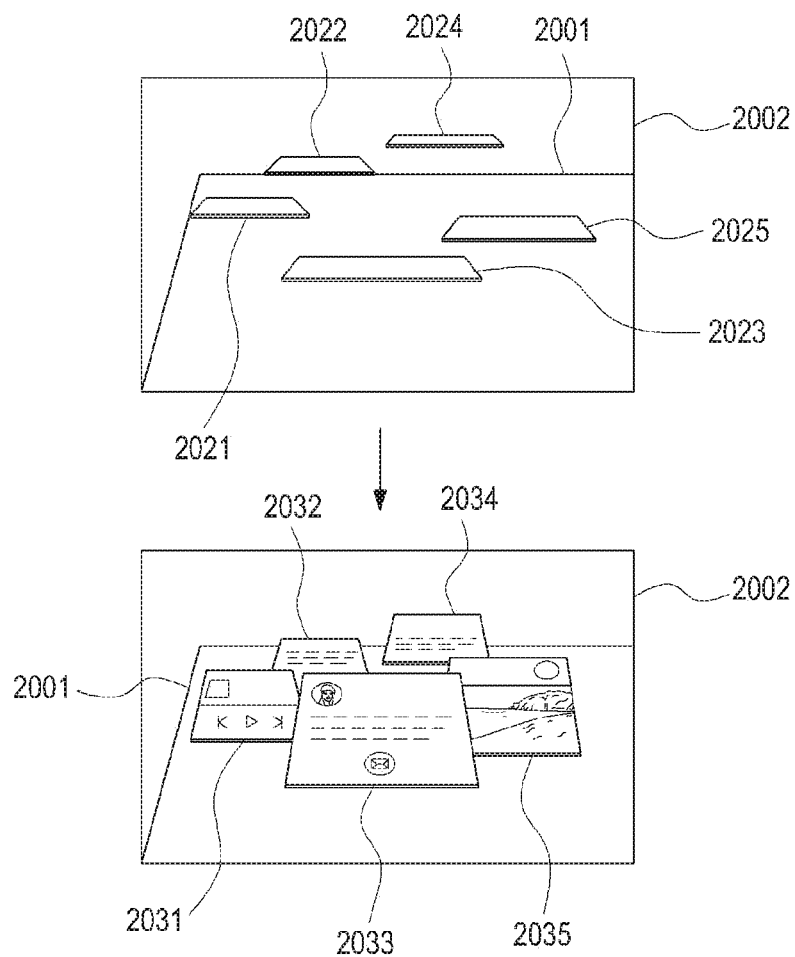
FIG. 20 illustrates a diagram of displaying detailed information about at least some objects of an electronic device, according to an embodiment of the present disclosure.

FIG. 20 is a diagram of displaying detailed information about at least some objects of an electronic device, according to an embodiment of the present disclosure.

As shown in FIG. 20, in the second state where a first display 2001 and a second display 2002 are opened at a predetermined angle (e.g., 10°) or more, the processor may sense the third state where the first display 2001 and the second display 2002 are further opened at a predetermined angle (e.g., 20°) or more.

Once sensing the third state where the first display 2001 and the second display 2002 are further opened at the predetermined angle (e.g., 20°) or more in the second state where the first display 2001 and the second display 2002 are opened at the predetermined angle (e.g., 10°) or more, the processor may display, on the second display 2002, detailed information 2031, 2032, 2033, 2034, and 2035 about at least some objects 2021, 2022, 2023, 2024, and 2025 displayed on the second display 2002.

Figure 21:
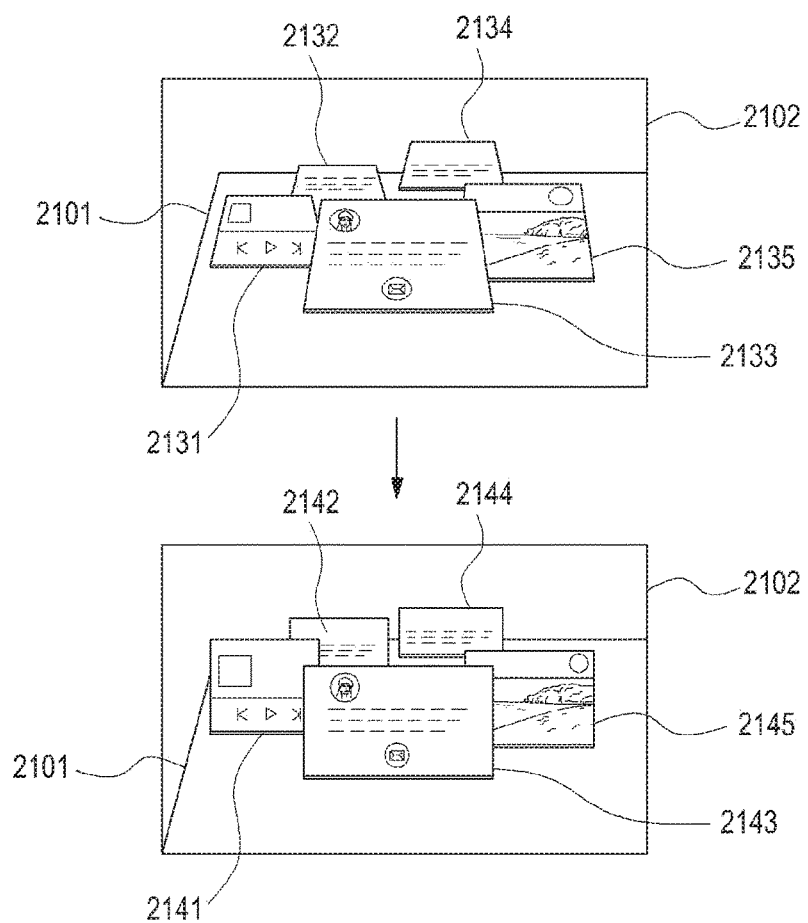
FIG. 21 illustrates a diagram of enlarging detailed information, according to an embodiment of the present disclosure.

FIG. 21 is a diagram of enlarging detailed information, according to an embodiment of the present disclosure.

The processor may sense the fourth state where a first display 2101 and a second display 2102 are further opened at a predetermined angle (e.g., 30°) or more in the third state where they are opened at a predetermined angle (e.g., 20°) or more.

Once sensing the fourth state where the first display 2101 and the second display 2102 are opened at the predetermined angle (e.g., 30°) or more, the processor may enlarge detailed information 2141, 2142, 2143, 2144, and 2145 about at least some objects 2131, 2132, 2133, 2134, and 2135 displayed on the first display 2102 and display enlarged detailed information 2141, 2142, 2143, 2144, and 2145 about the at least some objects 2131, 2132, 2133, 2134, and 2135 on the second display 2102.

Figure 22:
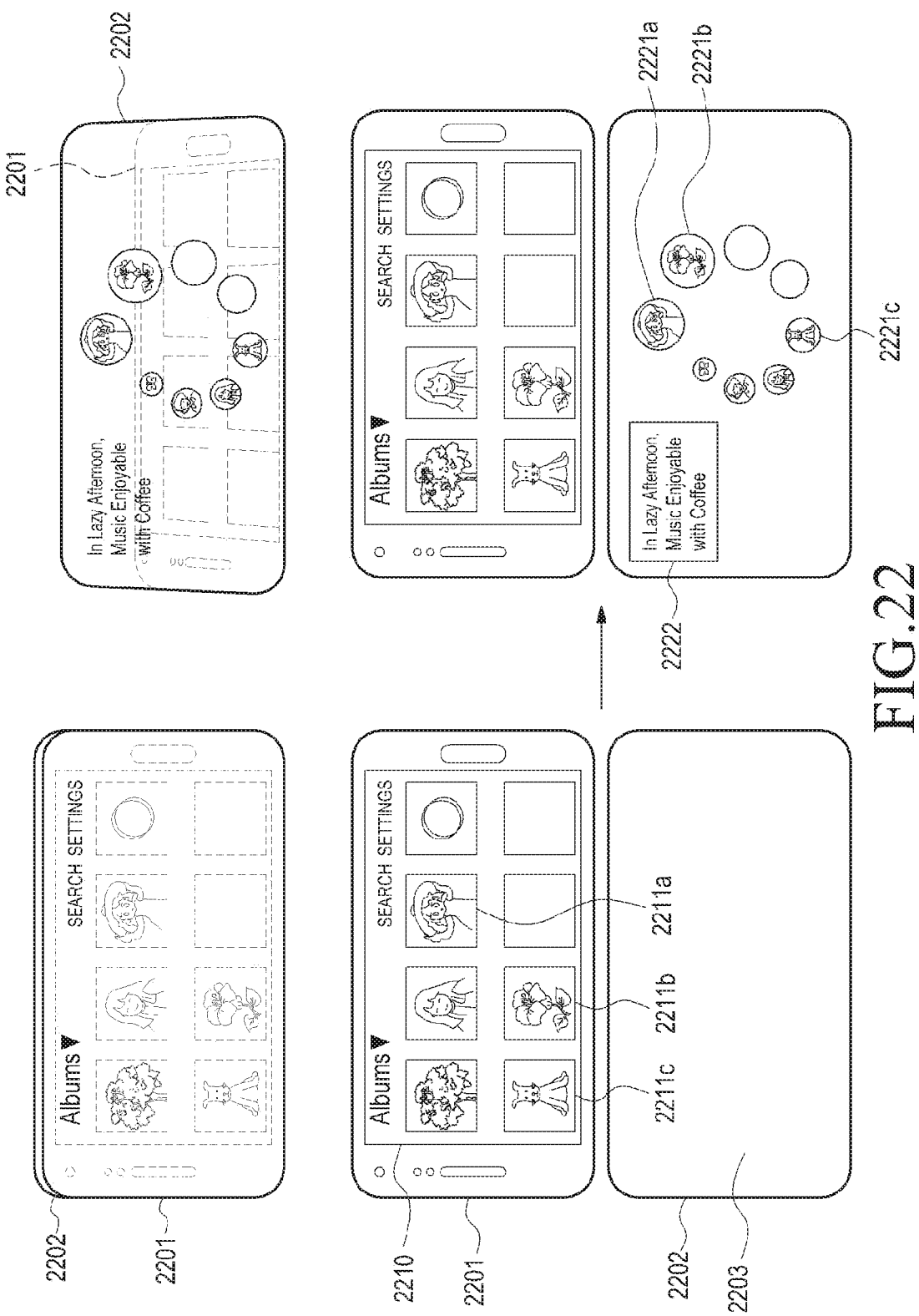
FIG. 22 shows screen shots of an electronic device, according to an embodiment of the present disclosure.

FIG. 22 shows screen shots of an electronic device, according to an embodiment of the present disclosure.

As shown in FIG. 22, a processor of the electronic device displays a plurality of objects 2211a, 2211b, and 2211c on a screen 2210 of a first display 2201 in the first state where the first display 2201 and a second display 2202 overlap each other.

The processor may sense a change from the first state to the second state where the first display 2201 and the second display 2202 are opened at a predetermined angle (e.g., 10°) or more.

Once sensing the change to the second state where the first display 2201 and the second display 2202 are opened at the predetermined angle (e.g., 10°) or more, the processor may display at least some objects 2221a, 2221b, and 2221c among a plurality of objects 2211a, 2211b, and 2211c displayed on the first display 2201 and/or detailed information 2222 about the at least some objects 2221a, 2221b, and 2221c on a second surface 2203 of the second display 2202.

Figure 23:
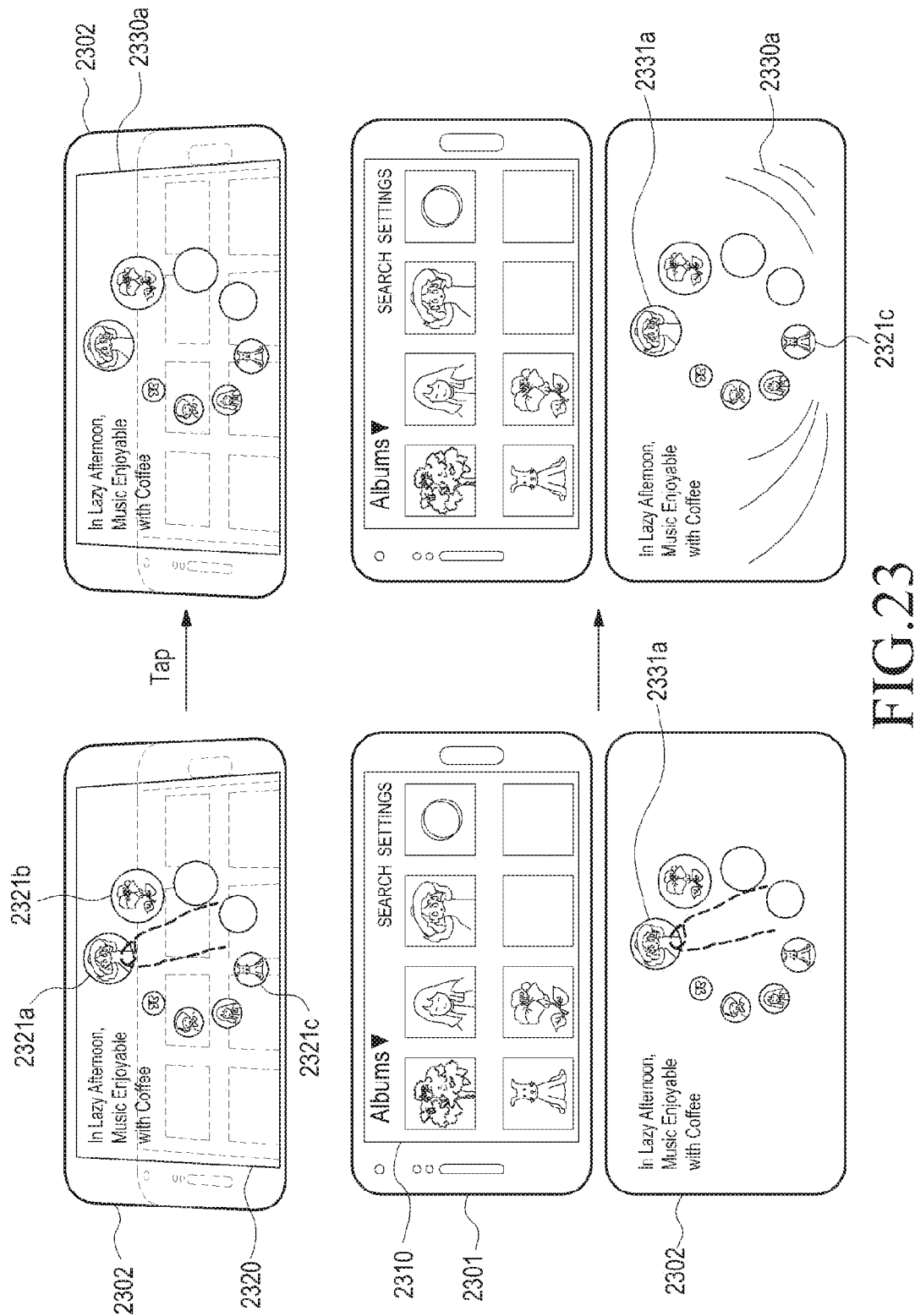
FIG. 23 shows screen shots of an electronic device, according to an embodiment of the present disclosure.

FIG. 23 shows screen shots of an electronic device, according to an embodiment of the present disclosure.

As shown in FIG. 23, in the second state where a first display 2301 and a second display 2302 are opened at a particular angle (e.g., 10°), the processor may display a plurality of objects 2310 on the first display 2301 and at least some objects 2321a, 2321b, and 2321c on the second display 2302.

In the second state where the first display 2301 and the second display 2302 are opened at a particular angle (e.g., 10°), in the state where the plurality of objects 2310 are displayed on the first display 2301, and/or in the state where the at least some objects 2321a, 2321b, and 2321c are displayed on the second display 2302, the processor may receive a touch input with respect to the first object 2321a among the at least some objects 2321a, 2321b, and 2321c displayed on the second display 2302.

Upon receiving the touch input with respect to the first object 2321a among the at least some objects 2321a, 2321b, and 2321c displayed on the second display 2302, the processor may display a produced animation 2330a corresponding to the first object 2321a for which the touch input is received on the second display 2302.

Figure 24:
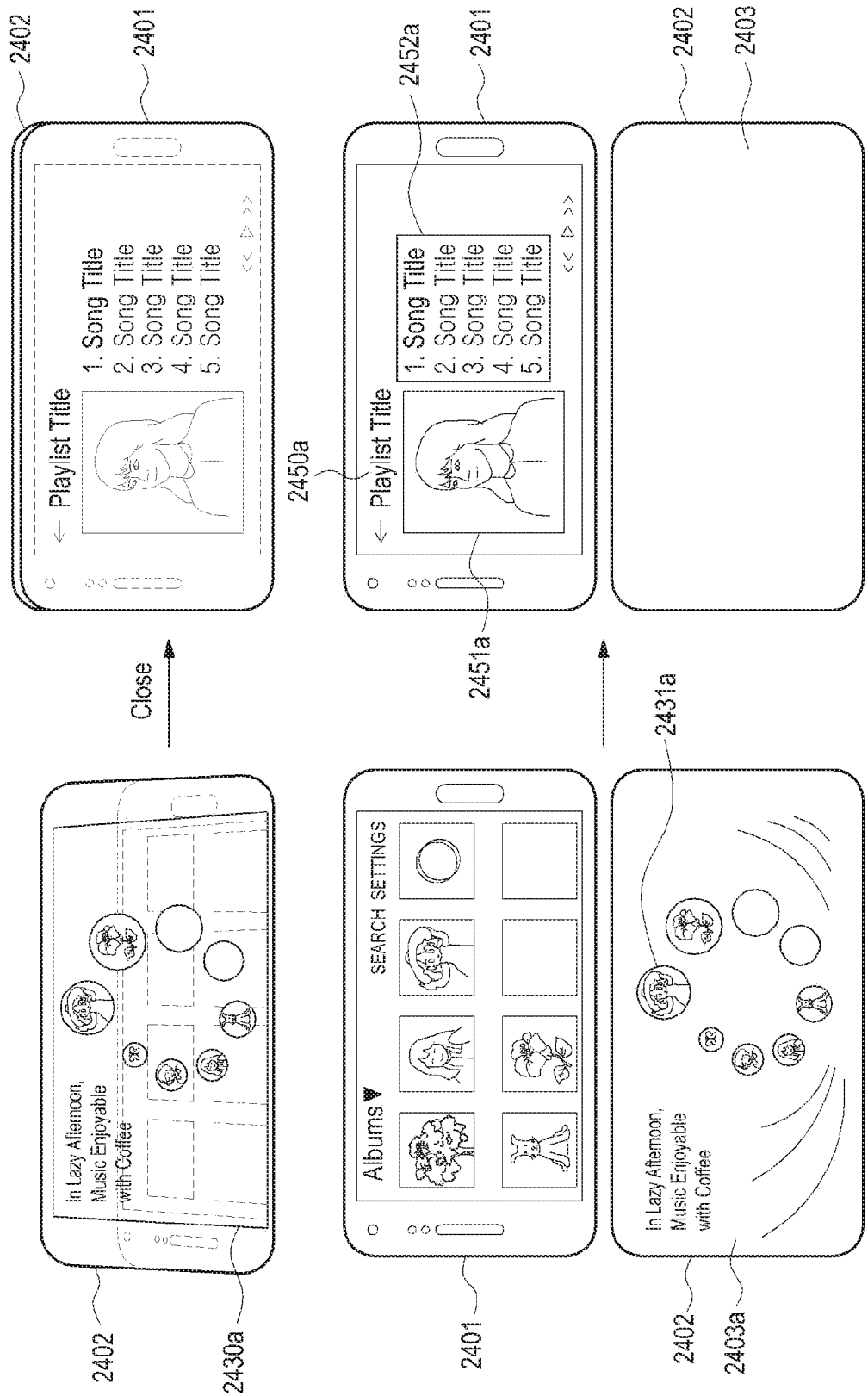
FIG. 24 shows screen shots of displaying detailed information about an electronic device, according to an embodiment of the present disclosure.

FIG. 24 shows screen shots of displaying detailed information about an electronic device, according to an embodiment of the present disclosure.

As shown in FIG. 24, in the second state where a first display 2401 and a second display 2402 are opened at a predetermined angle (e.g., 10°) or more, the processor may sense the first state where the first display 2401 and the second display 2402 overlap each other.

Once sensing the first state where the first display 2401 and the second display 2402 overlap each other, the processor may display detailed information 2450a, 2451a, and 2452a about a first object 2431a among at least some objects displayed on the second display 2402 on the first display 2401. The first object 2431a may be a first sound source, and the detailed information 2450a, 2451a, and 2452a about the first object 2431a may include figure information 2451a corresponding to the first sound source and plural sound source information 2452a corresponding to the first sound source.

Figure 25:
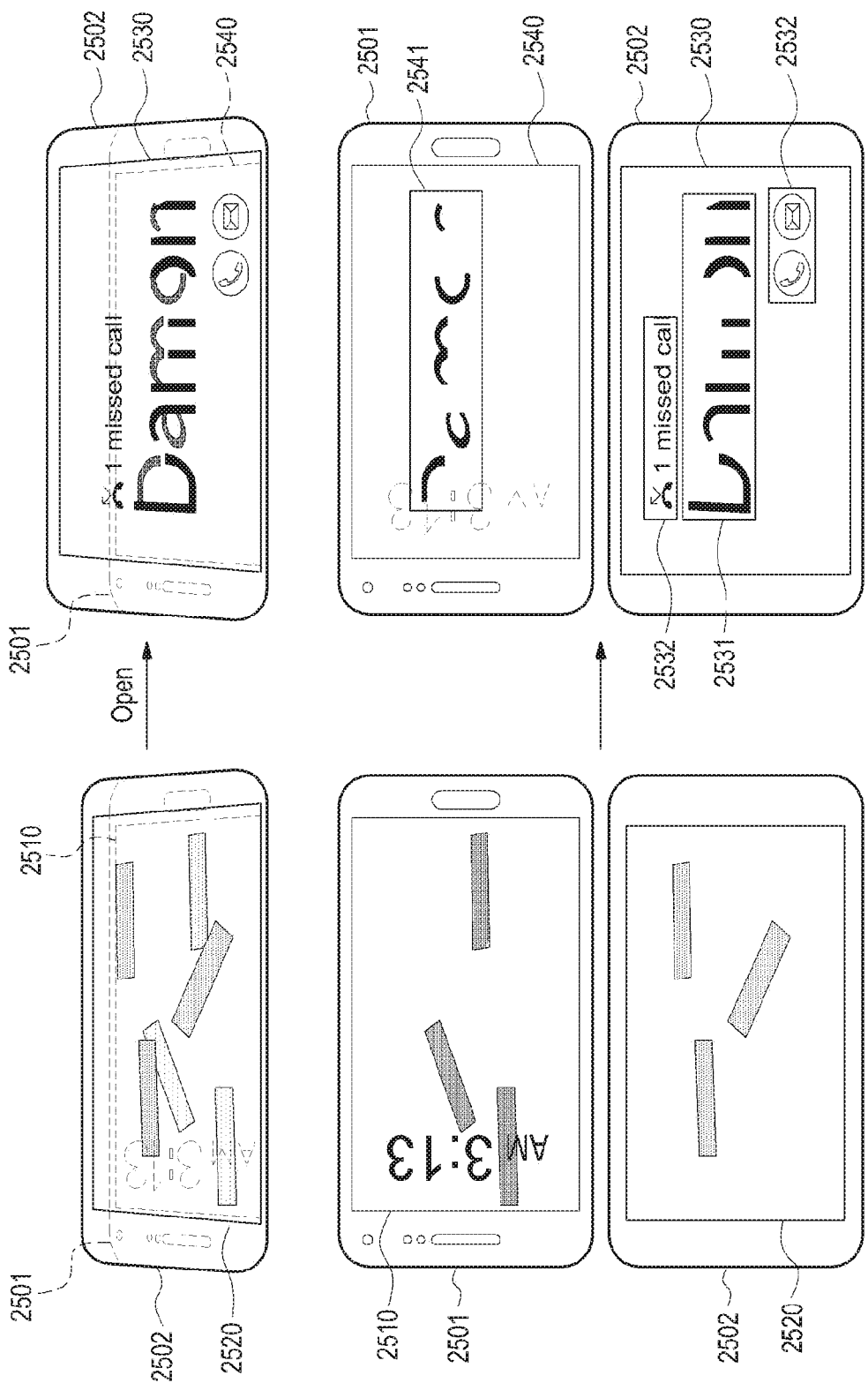
FIG. 25 shows screen shots of an electronic device, which corresponds to a user's gaze, according to an embodiment of the present disclosure.

FIG. 25 shows screen shots of an electronic device, which corresponds to a user's gaze, according to an embodiment of the present disclosure.

As shown in FIG. 25, a processor of the electronic device displays first objects 2510 on a first display 2501 and second objects 2520 on a second display 2502.

In the first state where a first display 2501 and a second display 2502 overlap each other, the processor may sense the second state where the first display 2501 and the second display 2502 are opened at a predetermined angle (e.g., 10°) or more.

The processor may sense the second state where the first display 2501 and the second display 2502 are opened at the predetermined angle (e.g., 10°) or more, and display detailed information 2541 about the first objects 2510, instead of the first objects 2510 displayed on the first display 2501, on the first display 2501.

The processor may sense the second state where the first display 2501 and the second display 2502 are opened at the predetermined angle (e.g., 10°) or more, and display detailed information 2531 and 2532 about the second objects 2520, instead of the first objects 2520 displayed on the second display 2502.

The first objects and/or the second objects may include first characters and/or second characters, and the detailed information about the first objects and/or the detailed information about the second objects may include a part of a character included in particular characters.

The processor of the electronic device may obtain user gaze information detected by a camera module (e.g., the camera module 209) of the electronic device.

The processor of the electronic device may display parts 2541 of particular characters "Damon" on the first display 2501 and 1532 and parts 2531 the second display 2502 to display the particular characters "Damon" corresponding to a user's gaze direction based on the user gaze information.

Figure 26:
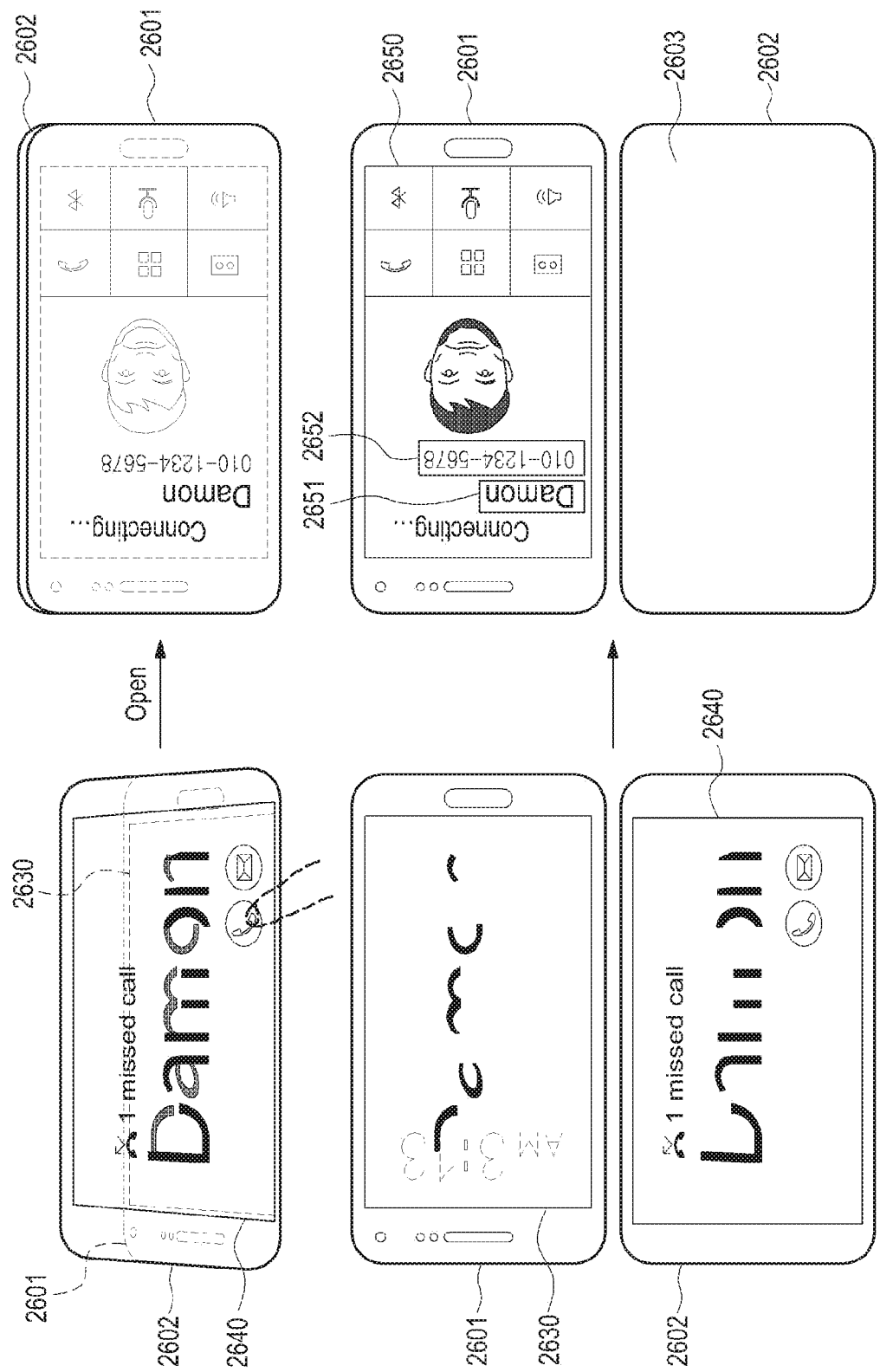
FIG. 26 shows screen shots of an electronic device, according to an embodiment of the present disclosure.

FIG. 26 shows screen shots of an electronic device, according to an embodiment of the present disclosure.

As shown in FIG. 26, a processor of the electronic device displays a part 2630 of the particular character "Damon" on a first display 2601 and a part 2640 of the particular character "Damon" on a second display 2602.

The processor may sense the first state where the first display 2601 and the second display 2602 overlap each other.

Upon sensing the first state where the first display 2601 and the second display 2602 overlap each other, the processor may send a request for a call to a contact number corresponding to the particular character "Damon" that the first display 2601 and the second display 2602 display together corresponding to the user's gaze.

Upon sensing the first state where the first display 2601 and the second display 2602 overlap each other, the processor may display identification information 2651 corresponding to the particular character "Damon" that the first display 2601 and the second display 2602 display together corresponding to the user's gaze, and contact number information 2652 corresponding to the particular character on a screen 2650 of the first display 2601.

Figure 27:
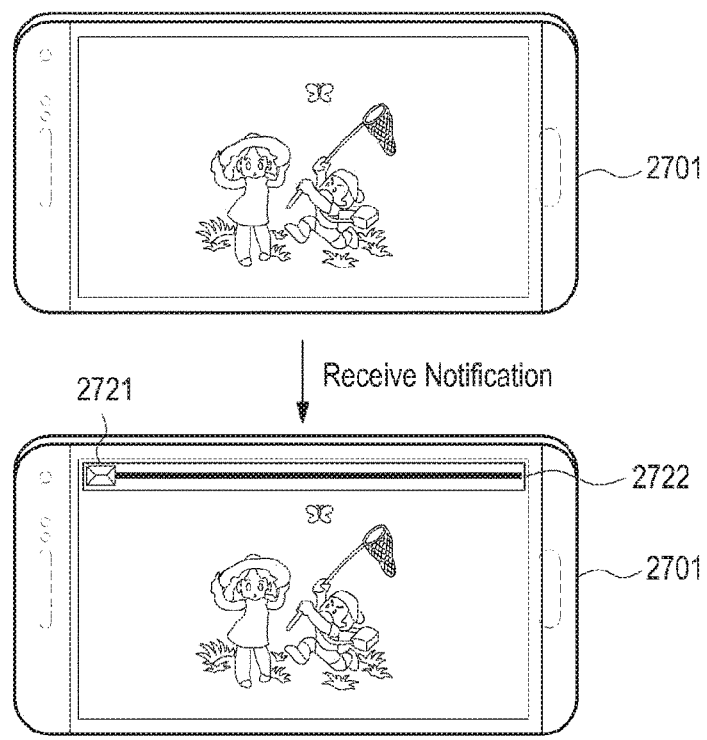
FIG. 27 shows screen shots of an electronic device, according to an embodiment of the present disclosure.

FIG. 27 shows screen shots of an electronic device, according to an embodiment of the present disclosure.

As shown in FIG. 27, a processor of the electronic device receives specific "Notification" information from an external electronic device (e.g., a server).

Upon receiving the specific "Notification" information, the processor displays identification information 2721 and 2722 about the received specific information on a first display 2701.

Figure 28:
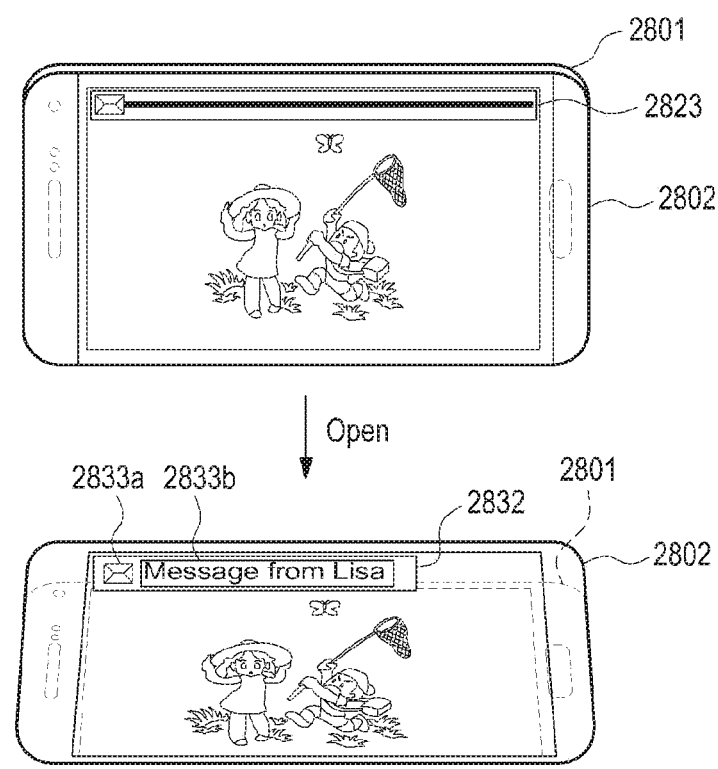
FIG. 28 shows screen shots of displaying detailed information regarding specific information, according to an embodiment of the present disclosure.

FIG. 28 shows screen shots of displaying detailed information regarding specific information, according to an embodiment of the present disclosure.

In the state where identification information 2823 shown in FIG. 28 is displayed on a first display 2801, the processor may sense the second state where the first display 2801 and a second display 2802 are opened at a predetermined angle (e.g., 10°) or more.

Once sensing the second state where the first display 2801 and the second display 2802 are opened at the predetermined angle (e.g., 10°) or more, the processor may generate detailed information 2833a and 2833b about the identification information 2823 and display the generated detailed information 2833a and 2833b on the second display 2802.

Figure 29:
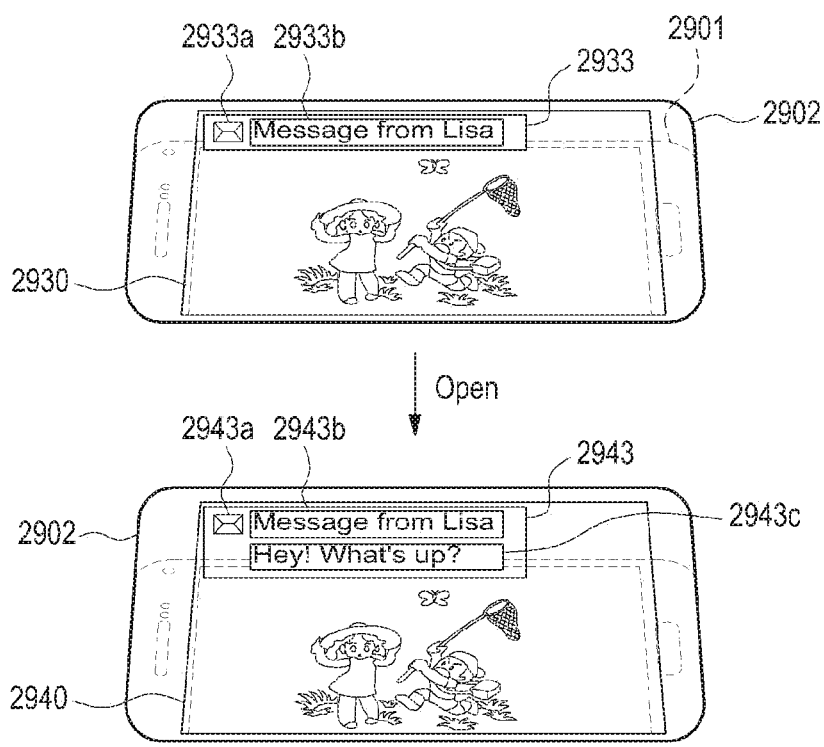
FIG. 29 shows screen shots of enlarging detailed information about an electronic device, according to an embodiment of the present disclosure.

FIG. 29 shows screen shots of enlarging detailed information about an electronic device, according to an embodiment of the present disclosure.

According shown in FIG. 29, in the state where detailed information 2933a and 2933b of an object 2933 are displayed on a screen 2930 of a second display 2902, the processor may sense the third state where a first display 2901 and the second display 2902 are opened at a predetermined angle (e.g., 20°) or more.

Once sensing the third state where that the first display 2901 and the second display 2902 are opened at the predetermined angle (e.g., 20°) or more, the processor may enlarge and/or change detailed information 2933 of the screen 2930 displayed on the second display 2902 and display an object 2943 enlarged the object 2933 and/or changed detailed information 2943a, 2943b, and 2943c on a second surface 2940 of the second display 2902.

Figure 30:
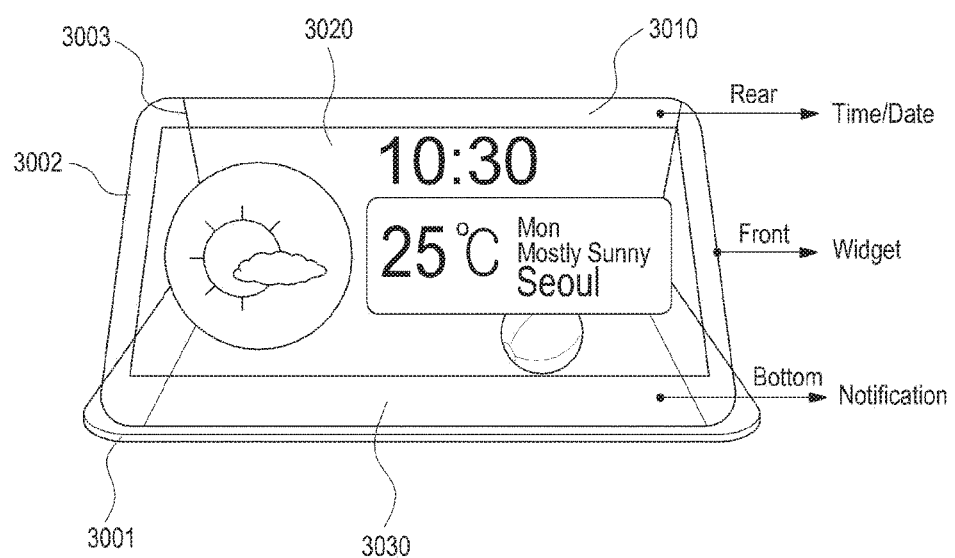
FIG. 30 illustrates a diagram of displaying an animation effect indicating a third display, according to an embodiment of the present disclosure.

FIG. 30 illustrates displaying a third display animation effect, according to an embodiment of the present disclosure.

As shown in FIG. 30, an electronic device (e.g., the electronic device 200) may include a first display 3001 including a third surface 3030, and a second display 3002 including a second surface 3020 directed outside and a fourth surface (e.g., the first surface 204) opposing the second surface 3020.

The processor may display an animation effect on a second display 3002, such that it looks as if a third display 3003 including a first surface 3010 directed toward the fourth surface 204 and the third surface 3030 is connected with the first display 3001 and the second display 3002. The processor may display an animation effect indicating the third display 3003 on the second display 3002, while making it look as if the third display 3003 including the first surface 3010 directed toward the fourth surface 204 and the third surface 3030 is connected with the first display 3001 and the second display 3002.

The processor of the electronic device may display notification information (Notification) received from an external source through the first display (bottom) 3001, display widget information (Widget) received from the external source through the second display (front) 3002, and display time information and/or date information (Time/Date) received from the external source through the third display animation effect 3003.

Figure 31:
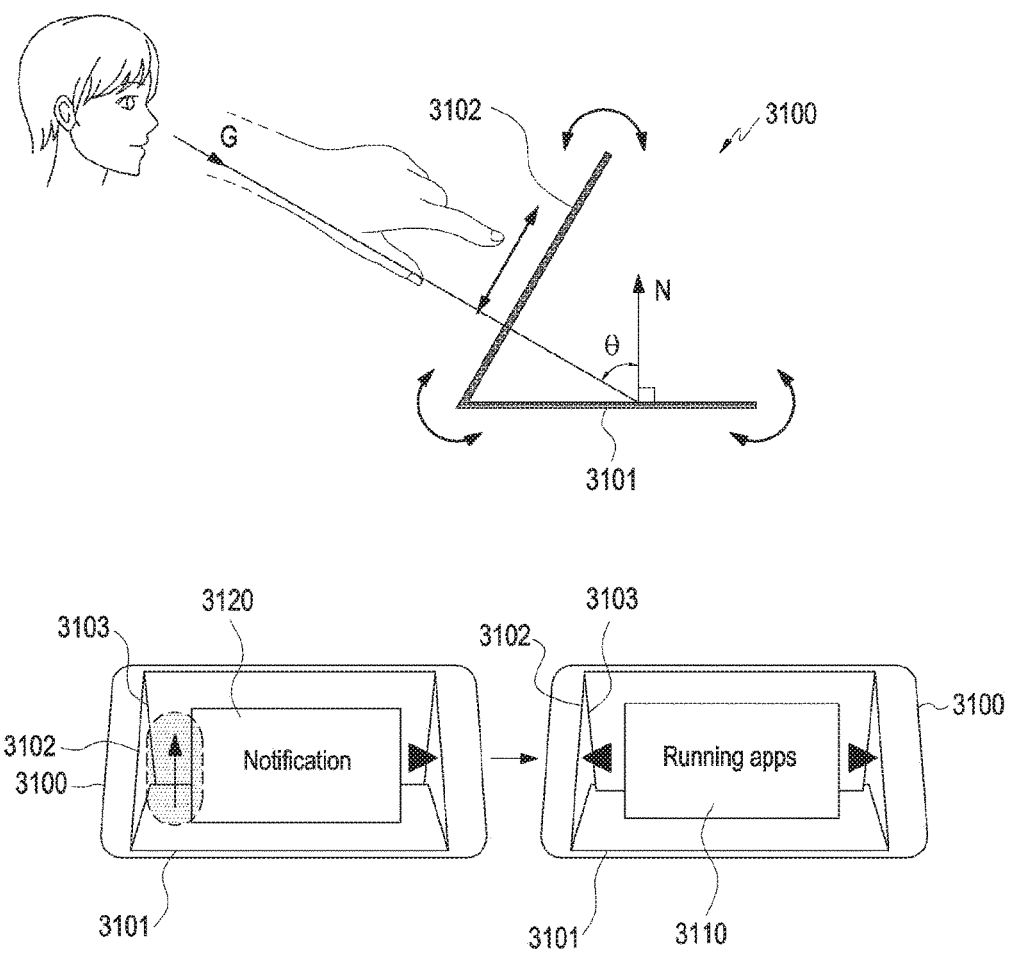
FIG. 31 illustrates a diagram of an electronic device, according to an embodiment of the present disclosure.

FIG. 31 illustrates an electronic device, according to an embodiment of the present disclosure.

As shown in FIG. 31, a processor of an electronic device 3100 may change a screen displayed on each of a first display 3101, a second display 3102 and/or a third display animation effect 3103 displayed on the second display 3102, based on an upward and/or downward flick input with respect to the second display 3102. Also shown in FIG. 31 is user gaze vector G provided at an angle θ from vector N that extends perpendicular from the first display 3101.

The processor may display notification information ("Notification") 3120 displayed on the second display 3102 on the third display animation effect 3103 displayed on the second display 3102, based on the upward flick input with respect to the second display 3102.

The processor may display, on the first display 3101 instead of the third display 3103, particular information displayed on the third display animation effect 3103 displayed on the second display 3102, based on displayed on the second display 3102, based on the upward flick input with respect to the second display 3102.

The processor may display running application information ("Running apps") 3110 displayed on the first display 3101 on the second display 3102 instead of the first display 3101, based on the upward flick input with respect to the second display 3102.

Figure 32:
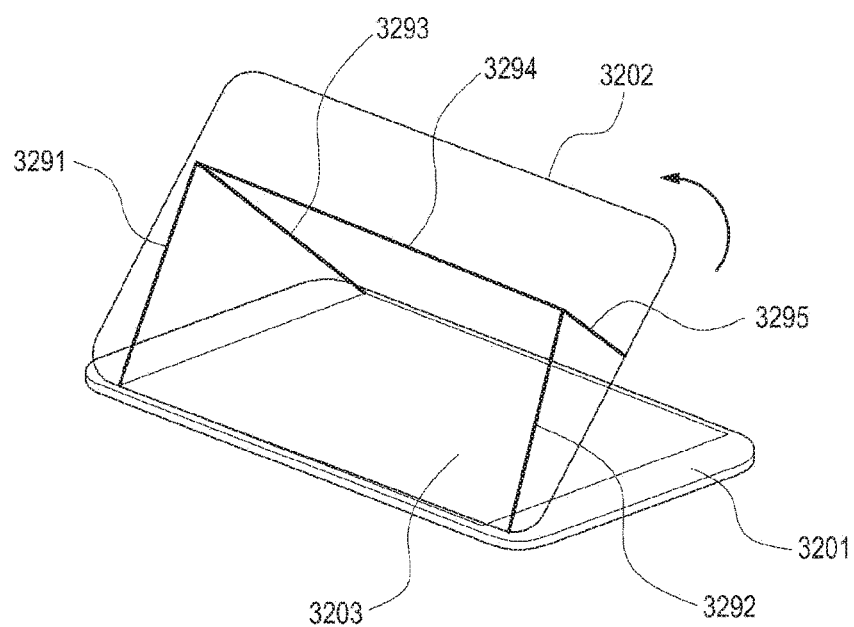
FIG. 32 illustrates a diagram of displaying a second display of an electronic device, according to an embodiment of the present disclosure.

FIG. 32 illustrates displaying a second display of an electronic device, according to an embodiment of the present disclosure.

As shown in FIG. 32, a processor of the electronic device senses the second state where a second display 3202 is fixed at a predetermined angle (e.g., 30°) in the first state where the second display 3202 overlap a first display 3201.

once sensing the second state where the second display 3202 is fixed at the predetermined angle (e.g., 30°) in the first state where the second display 3202 overlap the first display 3201, the processor may generate animation effects 3291, 3292, 3293, 3294, and 3295 for generating a third display 3203 and display the animation effects 3291, 3292, 3293, 3294, and 3295 on the second display 3202.

Figure 33:
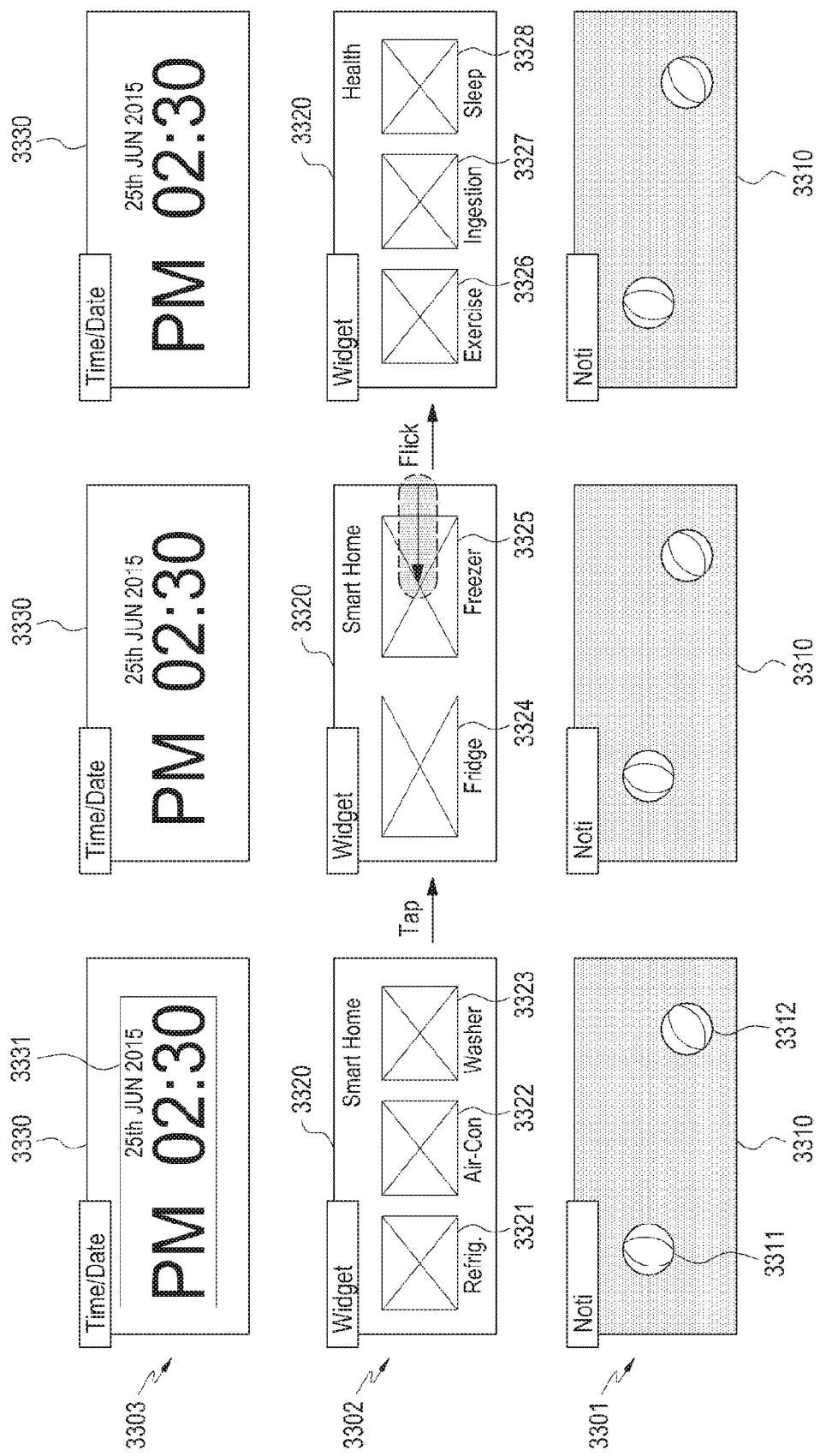
FIG. 33 illustrates a diagram of displaying specific information through a first display, a second display, and a third display animation effect based on the second display in an electronic device, according to an embodiment of the present disclosure.

FIG. 33 is a diagram of displaying information through a first display, a second display, and a third display, according to an embodiment of the present disclosure.

As shown in FIG. 33, a processor of the electronic device displays a notification information screen 3310 including notification objects 3311 and 3312 on a first display 3301.

The processor of the electronic device may display a smart home widget information screen 3320 including refrigerator information 3321, air conditioner information 3322, and washer information 3323 on the second display 3302.

The processor of the electronic device may display time/date information 3330 including a time and a date 3331 on the third display 3303.

The processor may obtain a side flick input with respect to the second display 3302.

The processor may change at least one object included in the widget information screen 3320 displayed on the second display 3302 in response to the side flick input with respect to the second display 3302. For example, the processor may display the widget information screen 3320 including fridge information 3324 and freezer information 3325, instead of the refrigerator information 3321, the air conditioner information 3322, and the washer information 3323 displayed on the second display 3302. The processor may obtain a side flick input with respect to the second display 3302.

The processor may display exercise information 3326, ingestion information 3327, and sleep information 3328, instead of the fridge information 3324 and the freezer information 3325, on the second display 3302, in response to a side flick input with respect to the second display 3302.

Figure 34:
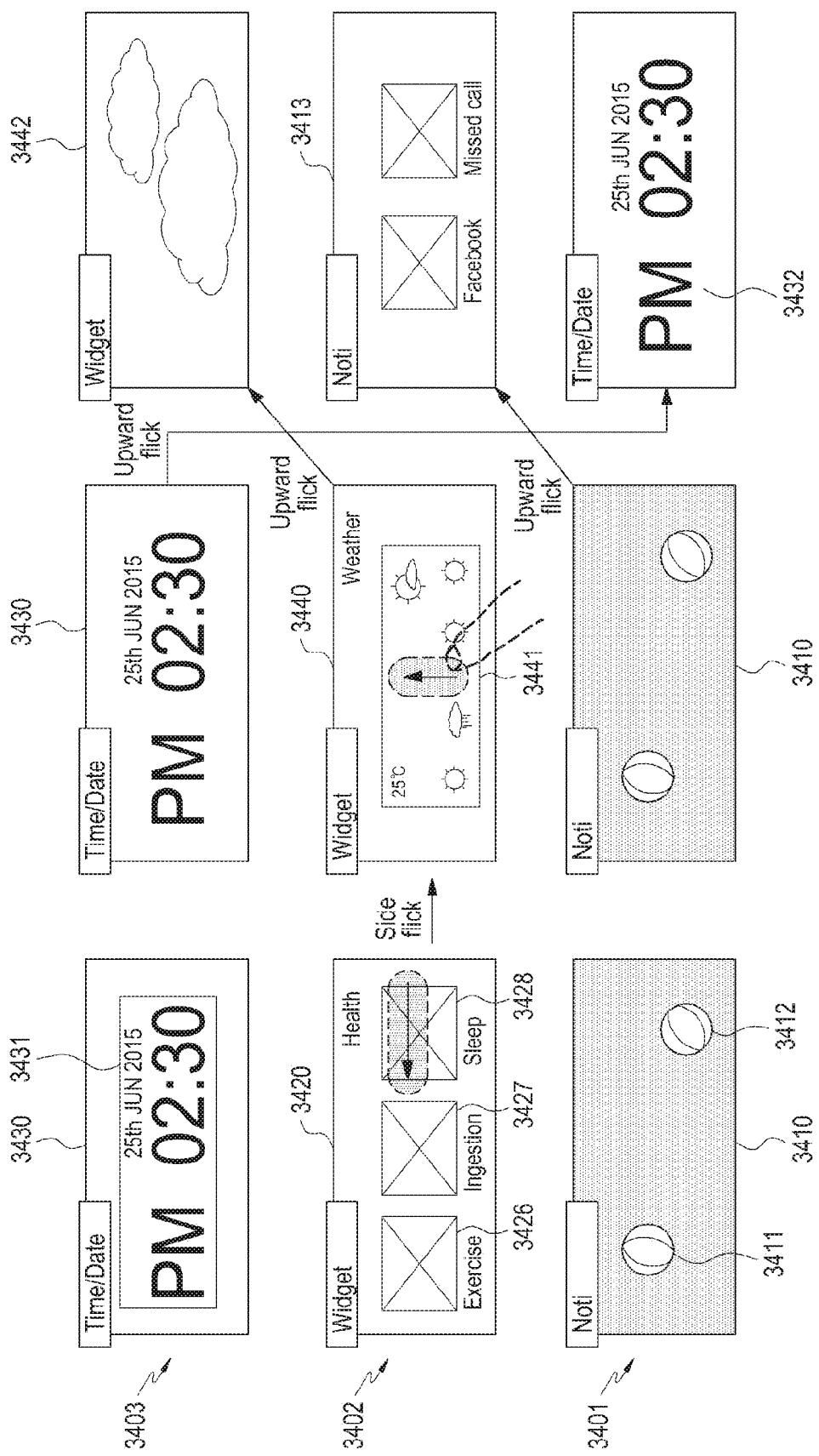
FIG. 34 illustrates a diagram of displaying specific information through a first display and a second display, and a third display animation effect based on the second display in an electronic device, according to an embodiment of the present disclosure.

FIG. 34 is a diagram of displaying information through a first display, a second display, and a third display, according to an embodiment of the present disclosure.

As shown in FIG. 34, a processor of the electronic device displays a widget information screen 3440 including widget information 3441, instead of exercise information 3426, ingestion information 3427, and sleep information 3428 displayed on the second display 3402, on the second display 3402, based on the side flick input with respect to the second display 3402.

The processor may receive an upward flick input.

In response to the upward flick input, the processor may change the widget information screen 3440 displayed on the second display 3402 suitably for characteristics of a third display 3403 and display a changed widget information screen 3442 on the third display 3403.

In response to the upward flick input, the processor may change a notification information screen 3410 (including some objects 3411, 3412) displayed on the first display 3401 suitably for characteristics of the second display 3402 and display a changed notification information screen 3413 on the second display 3402.

In response to the upward flick input, the processor may change a time/date information 3431 screen 3430 displayed on the third display 3403 suitably for characteristics of the first display 3401 and display a changed time/date information screen 3432 on the first display 3401.

FIG. 35 is a diagram of an electronic device, according to an embodiment of the present disclosure.

As shown in FIG. 35, a processor of the electronic device receives an upward flick input on a second display 3502.

In response to the upward flick input, the processor may change a notification information screen 3413 displayed on the second display 3502 suitably for characteristics of a third display 3503 and display a changed notification information screen 3517 (including 3515, 3516) on the third display 3503.

In response to the upward flick input, the processor may change a widget information screen 3542 displayed on the third display 3503 suitably for characteristics of the first display 3501 and display a changed widget information screen 3543 on the first display 3501.

In response to the upward flick input, the processor may change a time/date information screen 3532 displayed on the first display 3501 suitably for characteristics of the second display 3502 and display a changed time/date information screen 3533 on the second display 3502.

The processor may receive a side flick input on the second display 3502.

In response to the side flick input, the processor may display a detailed information screen 3534 regarding the time/date information screen 3533 displayed on the second display 3502.

Without making an enlargement input or a selection with respect to an object displayed on an opaque display, a user may view detailed information about a plurality of objects displayed on the opaque display or enlarge and view the plurality of objects on a transparent display merely by raising the transparent display.

An electronic device includes a first display configured to display a screen, a second display including a first surface facing the screen of the first display in a first state and a second surface opposing the first surface, a connector configured to pivotally connect the first display and the second display with each other, and a processor configured to display at least some objects among a plurality of objects displayed on the screen of the first display on the second display, based on an angle between the first display and the second display.

The processor may be further configured to display the at least some objects on the second display based on a touch with respect to the second display and the angle.

The second display may receive a touch with respect to some objects among the at least some objects, and the processor may be further configured to display detailed information about the some objects on the second display based on the touch with respect to the some objects and the angle.

The processor may be further configured to display objects among the plurality of objects on the second display according to a predetermined condition.

If the angle is a first angle, the processor may be further configured to display at least some objects among the plurality of objects on the second surface of the second display and reversely display the at least some objects displayed on the second surface on the first surface of the second display.

If the angle is a second angle, the processor may be further configured to display at least some objects among the plurality of objects on the first surface of the second display and to reversely display the at least some objects displayed on the first surface on the second surface of the second display.

The electronic device may further include a camera module, and the processor may be further configure to determine the first angle or the second angle based on user gaze information obtained using the camera module.

The first angle may be less than an angle between a user's gaze direction corresponding to the user gaze information and the first display, and the second angle may be greater than the angle between the user's gaze direction and the first display.

If the angle is a third angle, the processor may be further configured to enlarge at least some objects among the plurality of objects and display the enlarged at least some objects on the second display.

If the angle is a fourth angle, the processor may be further configured to display detailed information about the enlarged at least some objects on the second display.

The processor may be further configure to change a position of the at least some objects based on user gaze information obtained using the camera module.

The processor may be further configured to display at least some objects among the plurality of objects on the second surface of the second display and display other some objects among the plurality of objects on the screen of the first display, such that the plurality of objects are displayed corresponding to the user's gaze direction as if the plurality of objects are viewed in front of the screen of the first display.

A method for controlling an electronic device including a first display configured to display a screen, a second display including a first surface facing the screen of the first display in a first state and a second surface opposing the first surface, and a connector configured to pivotally connect the first display and the second display with each other includes displaying a screen on the first display and displaying at least some objects among a plurality of objects displayed on the screen of the first display on the second display, based on an angle between the first display and the second display.

The displaying of the at least some objects on the second display may include displaying the at least some objects on the second display based on a touch with respect to the second display and the angle.

The displaying of the at least some objects on the second display may include displaying objects among the plurality of objects on the second display according to a predetermined condition.

The displaying of the at least some objects on the second display may include, if the angle is a first angle, displaying at least some objects among the plurality of objects on the second surface of the second display and reversely displaying the at least some objects displayed on the second surface on the first surface of the second display.

The displaying of the at least some objects on the second display may include, if the angle is a second angle, displaying at least some objects among the plurality of objects on the first surface of the second display and reversely displaying the at least some objects displayed on the first surface on the second surface of the second display.

The displaying of the at least some objects on the second display may include, if the angle is a third angle, enlarging at least some objects among the plurality of objects and displaying the enlarged at least some objects on the second display.

The method may further include obtaining user gaze information, and the displaying of the at least some objects on the second display may include changing a position of the at least some objects based on the obtained user gaze information.

An electronic device includes a first display configured to display a screen, a second display including a first surface facing the screen of the first display in a first state and a second surface opposing the first surface, a connector configured to pivotally connect the first display and the second display with each other, and a processor configured to display at least some objects among a plurality of objects displayed on the screen of the first display on the second display, based on an angle between the first display and the second display, in which the processor includes a third surface that faces the first surface and the screen of the first display and is further configured to display an animation effect indicating a third display displaying other some objects among the plurality of objects on the second display.

At least a part of the apparatus (e.g., modules or functions thereof) or the method (e.g., operations) described herein may be implemented with a command stored in a non-transitory computer-readable storage medium in the form of a programming module. When the instructions are executed by one or more processors, the one or more processors may perform functions corresponding to the instructions. The non-transitory computer-readable storage medium may be, for example, a memory.

The non-transitory computer readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., read only memory (ROM), random access memory (RAM), flash memory, etc.), and so forth. Further, the program instructions include a machine language code created by a complier and a high-level language code executable by a computer using an interpreter. The foregoing hardware device may be configured to be operated as at least one software module to perform an operation of the present disclosure, or vice versa.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
a first display configured to display a screen;
a second display comprising a first surface facing the screen of the first display in a first state and a second surface opposing the first surface, wherein the second display is a transparent display;
a connector configured to pivotally connect the first display and the second display with each other; and
a processor configured to:
display, on the second display, at least one object corresponding to a plurality of objects displayed on the screen of the first display, the at least one object being identified based on an angle between the first display and the second display;
detect a touch input to a first object of the at least one object on the second display; and
display, on the first display, a screen including information corresponding to the first object based on the angle between the first display and the second display being a predetermined angle.

2. The electronic device of claim 1, wherein the processor is further configured to display the at least one object on the second display based on a touch input on the second display and the angle between the first display and the second display.

3. The electronic device of claim 2, wherein the second display is further configured to receive a touch input with respect to an object among the at least one object, and
the processor is further configured to display detailed information about the object on the second display based on the touch input with respect to the object among the at least one object and the angle between the first display and the second display.

4. The electronic device of claim 1, wherein the processor is further configured to display the at least one object corresponding to the plurality of objects on the second display according to a predetermined condition.

5. The electronic device of claim 1, further comprising a camera module,
wherein the processor is further configured to identify at least one of a first angle or a second angle based on user gaze information obtained using the camera module.

6. The electronic device of claim 5, wherein the first angle is smaller than an angle between a user's gaze direction corresponding to the user gaze information and the first display, and
wherein the second angle is greater than the angle between the user's gaze direction and the first display.

7. The electronic device of claim 5, wherein if the angle between the first display and the second display is the first angle, the processor is further configured to display the at least one object corresponding to the plurality of objects on the second surface of the second display, and to reversely display, on the first surface of the second display, the at least one object displayed on the second surface.

8. The electronic device of claim 5, wherein if the angle between the first display and the second display is the second angle, the processor is further configured to display the at least one object corresponding to the plurality of objects on the first surface of the second display, and to reversely display, on the second surface of the second display, the at least one object displayed on the first surface.

9. The electronic device of claim 1, wherein if the angle between the first display and the second display is a third angle, the processor is further configured to enlarge the at least one object corresponding to the plurality of objects and display the enlarged at least one object on the second display.

10. The electronic device of claim 9, wherein if the angle between the first display and the second display is a fourth angle, the processor is further configured to display detailed information about the enlarged the at least one object on the second display.

11. The electronic device of claim 1, further comprising a camera module,
wherein the processor is further configured to change a position of the at least one object based on user gaze information obtained using the camera module.

12. The electronic device of claim 11, wherein the processor is further configured to display the at least one object corresponding to the plurality of objects on the second surface of the second display and display, on the screen of the first display, objects corresponding to remaining objects of the plurality of objects, such that the at least one object is displayed corresponding to a user's gaze direction of the user gaze information.

13. A method for controlling an electronic device comprising a first display configured to display a screen, a second display comprising a first surface facing the screen of the first display in a first state and a second surface opposing the first surface wherein the second display is a transparent display, and a connector configured to pivotally connect the first display and the second display with each other, the method comprising:
displaying a screen on the first display;
displaying, on the second display, at least one object corresponding to a plurality of objects displayed on the screen of the first display, the one object being identified based on an angle between the first display and the second display;
detecting a touch input to a first object of the at least one object on the second display; and
displaying, on the first display, a screen including information corresponding to the first object based on the angle between the first display and the second display being a predetermined angle.

14. The method of claim 13, further comprising receiving a touch input on the second display,
wherein displaying the at least one object on the second display comprises displaying the at least one object on the second display based on the touch input on the second display and the angle between the first display and the second display.

15. The method of claim 13, wherein displaying the at least one object on the second display comprises displaying the at least one object corresponding to the plurality of objects on the second display according to a predetermined condition.

16. The method of claim 13, wherein displaying the at least one object on the second display comprises, if the angle between the first display and the second display is a first angle, displaying, on the second surface of the second display, the at least one object corresponding to the plurality of objects and reversely displaying, on the first surface of the second display, the at least one object displayed on the second surface.

17. The method of claim 13, wherein displaying the at least one object on the second display comprises, if the angle between the first display and the second display is a second angle, displaying, on the first surface of the second display, the at least one object corresponding to the plurality of objects and reversely displaying, on the second surface of the second display, the at least one object displayed on the first surface.

18. The method of claim 13, wherein displaying the at least one object on the second display comprises, if the angle between the first display and the second display is a third angle, enlarging at least one object corresponding to the plurality of objects and displaying the enlarged the at least one object on the second display.

19. The method of claim 13, further comprising obtaining user gaze information,
wherein displaying the at least one object on the second display comprises changing a position of the at least one object based on the obtained user gaze information.

20. An electronic device comprising:
a first display configured to display a screen;
a second display comprising a first surface facing the screen of the first display in a first state and a second surface opposing the first surface, wherein the second display is a transparent display;
a connector configured to pivotally connect the first display and the second display with each other; and
a processor configured to:
display at least one object corresponding to a plurality of objects displayed on the screen of the first display on the second display, based on an angle between the first display and the second display;
detect a touch input to a first object of the at least one object on the second display; and
display, on the first display, a screen including information corresponding to the first object based on the angle between the first display and the second display being a predetermined angle,
wherein the electronic device comprises a third surface that faces the first surface and the screen of the first display, and the processor is further configured to display an animation effect on a third display displaying remaining objects of the plurality of objects on the second display.

* * * * *